(12) United States Patent
Nagai et al.

(10) Patent No.: US 7,431,972 B2
(45) Date of Patent: Oct. 7, 2008

(54) OPTICAL FILM, AND POLARIZING PLATE AND LIQUID CRYSTAL DISPLAY DEVICE USING THE SAME

(75) Inventors: Michio Nagai, Minami-ashigara (JP); Akira Ikeda, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

(21) Appl. No.: 11/522,394

(22) Filed: Sep. 18, 2006

(65) Prior Publication Data

US 2007/0065601 A1 Mar. 22, 2007

(30) Foreign Application Priority Data

Sep. 16, 2005 (JP) .............................. 2005-269564

(51) Int. Cl.
*C09K 19/00* (2006.01)
*C09K 19/52* (2006.01)

(52) U.S. Cl. ..................... 428/1.1; 430/20; 430/270.1; 252/299.01

(58) Field of Classification Search ................... 430/20, 430/270.01, 270.1; 428/1.1; 252/299.01
See application file for complete search history.

(56) References Cited

U.S. PATENT DOCUMENTS 4,583,825 A    4/1986  Buzak
5,410,422 A    4/1995  Bos
5,583,679 A   12/1996  Ito et al.
5,646,703 A    7/1997  Kamada et al.
2006/0114385 A1* 6/2006  Ito et al. ..................... 349/119

FOREIGN PATENT DOCUMENTS

| DE | 39 11 620 A1 | 10/1990 |
| JP | 6-214116 A | 8/1994 |
| JP | 9-197397 A | 7/1997 |
| JP | 11-316378 A | 11/1999 |
| JP | 3056997 B2 | 4/2000 |
| JP | 2002-040429 A | 2/2002 |
| WO | WO96/37804 A1 | 11/1996 |

* cited by examiner

*Primary Examiner*—Geraldina Visconti
(74) *Attorney, Agent, or Firm*—Buchanan Ingersoll & Rooney PC

(57) ABSTRACT

An optical film comprising an optically anisotropic layer including a liquid crystalline compound, wherein the optically anisotropic layer satisfies the following formulae:

$$Re(450)/Re(650) < 1.25 \quad \text{Formula (1)}$$

wherein $Re(450)$ and $Re(650)$ are in-plane retardation values (unit: nm) of the optically anisotropic layer at wavelengths of 450 nm and 650 nm, respectively;

$$0.09 < Re\_m(550)/d \quad \text{Formula (2)}$$

wherein $Re\_m(550)$ is an in-plane retardation value (unit: nm) of a uniaxial alignment layer in which the director of the liquid crystalline compound is aligned to be parallel in the plane at a wavelength of 550 nm, and $d$ is the thickness of the uniaxial alignment layer (unit: nm).

10 Claims, 4 Drawing Sheets

OPTICAL FILM, AND POLARIZING PLATE AND LIQUID CRYSTAL DISPLAY DEVICE USING THE SAME

BACKGROUND OF THE INVENTION

1. Field of the Invention

The present invention relates to an optical film, and a polarizing plate and a liquid crystal display device using the same.

2. Description of the Related Art

A liquid crystal display device (LCD) has such large advantages as thin type, lightweight and low power consumption as compared with a CRT (Cathode Ray Tube). The liquid crystal display device is composed of a liquid crystal cell and a pair of polarizing plates arranged on both sides of the liquid crystal cell. The liquid crystal cell is composed of a rod-shaped liquid crystalline compound (liquid crystalline molecule), 2 substrates for sealing the same and electrode layers for applying voltage to the rod-shaped liquid crystalline compound. In order to align the sealed rod-shaped liquid crystalline compound, the 2 substrates are provided with an alignment film. In order to remove color of images displayed on the liquid crystal cell, an optical film (retardation plate) is often arranged between the liquid crystal cell and the polarizing plate. A laminated body of the polarizing plate and the optical film functions as an elliptically polarizing plate. Such function as widening a view angle of the liquid crystal cell is sometimes given to the optical film. A stretched birefringent film has been conventionally used as the optical film.

In place of a stretched birefringent film, use of an optical film having an optically anisotropic layer including a discotic liquid crystalline compound is also proposed (for example, refer to JP-A-6-214116, U.S. Pat. No. 5,583,679, U.S. Pat. No. 5,646,703 and DE-A-3911620). The optically anisotropic layer is formed by aligning a discotic liquid crystalline compound and fixing the aligned stated. A discotic liquid crystalline compound generally has a large birefringent index. In addition, a discotic liquid crystalline compound has multimodal alignment shapes. Accordingly, by using a discotic liquid crystalline compound, it is possible to manufacture an optical film having optical properties that can not be obtained from conventional stretched birefringent films.

There is proposed a liquid crystal display device using a liquid crystal cell of a bend alignment mode in which rod-shaped liquid crystalline compounds are aligned in substantially opposite directions (symmetrically) in the upper portion and the lower portion of the liquid crystal cell (for example, refer to U.S. Pat. No. 4,583,825 and U.S. Pat. No. 5,410,422). Since rod-shaped liquid crystalline compounds are aligned symmetrically in the upper portion and the lower portion of the liquid crystal cell, the liquid crystal cell of the bend alignment mode has a self-optical compensatory function. Consequently, this liquid crystal mode is also called an OCB (Optically Compensatory Bend) liquid crystal mode. A liquid crystal display device of the bend alignment mode has such advantage as quick response speed.

The bend alignment mode has such characteristics as a wide view angle and quick response speed as compared with general liquid crystal modes (TN mode, STN mode). However, when compared with a CRT, a further improvement is necessary. In order to further improve a liquid crystal display device of a bend alignment mode, use of an optical film is considered as is the case for general liquid crystal modes. However, conventional optical films composed of a stretched birefringent film were insufficient in an optical compensatory function for a liquid crystal display device of the bend alignment mode. As described above, in place of a stretched birefringent film, use of an optical film having an optically anisotropic layer including a discotic liquid crystalline compound and a support is proposed. Further, liquid crystal display devices of the bend alignment mode using an optical film including a discotic liquid crystalline compound are also proposed (for example, refer to JP-A-9-197397 and WO 96/37804). By using an optical film including a discotic liquid crystalline compound, the view angle of a liquid crystal display device of the bend alignment mode is significantly improved.

Such problem is indicated that, when an optical film including a discotic liquid crystalline compound is used for a liquid crystal display device of the bend alignment mode, light with a specific wavelength leaks to color the displayed image (for example, refer to JP-A-11-316378). There is described that this coloring is caused by wavelength dependence of the transmittance of an elliptically polarizing plate (laminated body of a polarizing film and an optical film). Since wavelength dependence of the anisotropy of a liquid crystalline compound used for a liquid crystal cell differs from wavelength dependence of the anisotropy of an optical film (for example, discotic liquid crystal), light with a short wavelength (blue) generally leaks in a liquid crystal display device of the bend alignment mode. However, by matching the chromatic dispersion of a liquid crystalline compound with that of an optical film (discotic liquid crystal), hue at the time of black level is improved.

And it is reported that, by arranging an optically anisotropic layer and a polarizing film so that an angle between an average direction of an orthogonal projection of the normal line of the disc plane of the discotic liquid crystalline compound onto the optically anisotropic layer and the in-plane transmission axis of the polarizing film substantially is 45°, the largest optical compensatory effect for a liquid crystal cell of the bend alignment mode can be obtained. With regard to a bend alignment liquid crystal device using an optical film including a discotic liquid crystalline compound, various methods have been proposed to lower hue alteration and prevent gradation reversal (for example, refer to Japanese Patent No. 3056997 and JP-A-2002-40429).

SUMMARY OF THE INVENTION

However, even when an optical compensatory sheet including a discotic liquid crystalline compound is used, it was difficult to prevent gradation reversal while satisfying contrast property, view angle property and hue in a bend alignment liquid crystal device. Further, in order to solve the problem, a large amount of elements used for an optical film became necessary, to lead to push up the cost.

The purpose of the present invention is to provide an optical film and a polarizing plate capable of appropriately optically compensating a liquid crystal cell, in particular a liquid crystal cell of a bend alignment mode, and further, to lower cost by reducing the use amount of elements of the optical film; and to provide a liquid crystal display device with a low cost for displaying good images having high contrast, excellent view angle property, no problem of hue at the time of black level and, in addition, generating no gradation reversal, by using such optical film to significantly lower transmittance of the front side and in polar angle directions of left, right, top and bottom at the time of black level, and by controlling wave distribution property of a discotic liquid crystalline compound for use in the optical film.

The purpose of the invention was achieved through the following (1)-(7).

(1) An optical film having an optically anisotropic layer (1) including a liquid crystalline compound, wherein the optically anisotropic layer (1) satisfies the following formulae (1) and (2):

$$Re(450)/Re(650)<1.25 \quad \text{Formula (1):}$$

wherein Re(450) and Re(650) are in-plane retardation values (unit: nm) of the optically anisotropic layer (1) at wavelengths of 450 nm and 650 nm, respectively;

$$0.09<Re\_m(550)/d \quad \text{Formula (2):}$$

wherein Re_m(550) is an in-plane retardation value (unit: nm) of a uniaxial alignment layer in which the director of a liquid crystalline compound constituting the optically anisotropic layer (1) is aligned to be parallel in the plane at a wavelength of 550 nm, and d is the thickness of the uniaxial alignment layer (unit: nm).

(2) The optical film described in (1), wherein the thickness of the optically anisotropic layer (1) is 1.5 µm or less.

(3) The optical film described in (1) or (2), wherein the liquid crystalline compound constituting the optically anisotropic layer (1) is a discotic liquid crystalline compound.

(4) The optical film described in any of (1)-(3) further including an optically anisotropic layer (2), wherein the optically anisotropic layer (2) is a cellulose acylate film.

(5) A polarizing plate having the optical film described in any of (1)-(4) and a polarizing film.

(6) A liquid crystal display device having a liquid crystal cell and the polarizing plate described in (5).

(7) The liquid crystal display device described in (6), wherein the liquid crystal cell is of an OCB system.

According to the invention, it becomes possible to provide an optical film that appropriately optically compensates a liquid crystal cell, in particular a liquid crystal cell of a bend alignment mode, and is thin. Further, by satisfying the property of the invention, it becomes possible to reduce the use amount of a liquid crystal compound when manufacturing the optical film, thereby providing an optical film with a low cost. Furthermore, by adopting such optical film, it becomes possible to provide a liquid crystal display device that has a significantly lowered transmittance of the front side and in polar angle directions of left, right, top and bottom at the time of black level, and displays good images having high contrast, excellent view angle property, no problem of hue at the time of black level, and generating no gradation reversal.

BEST MODE FOR CARRYING OUT THE INVENTION

Figure 1:
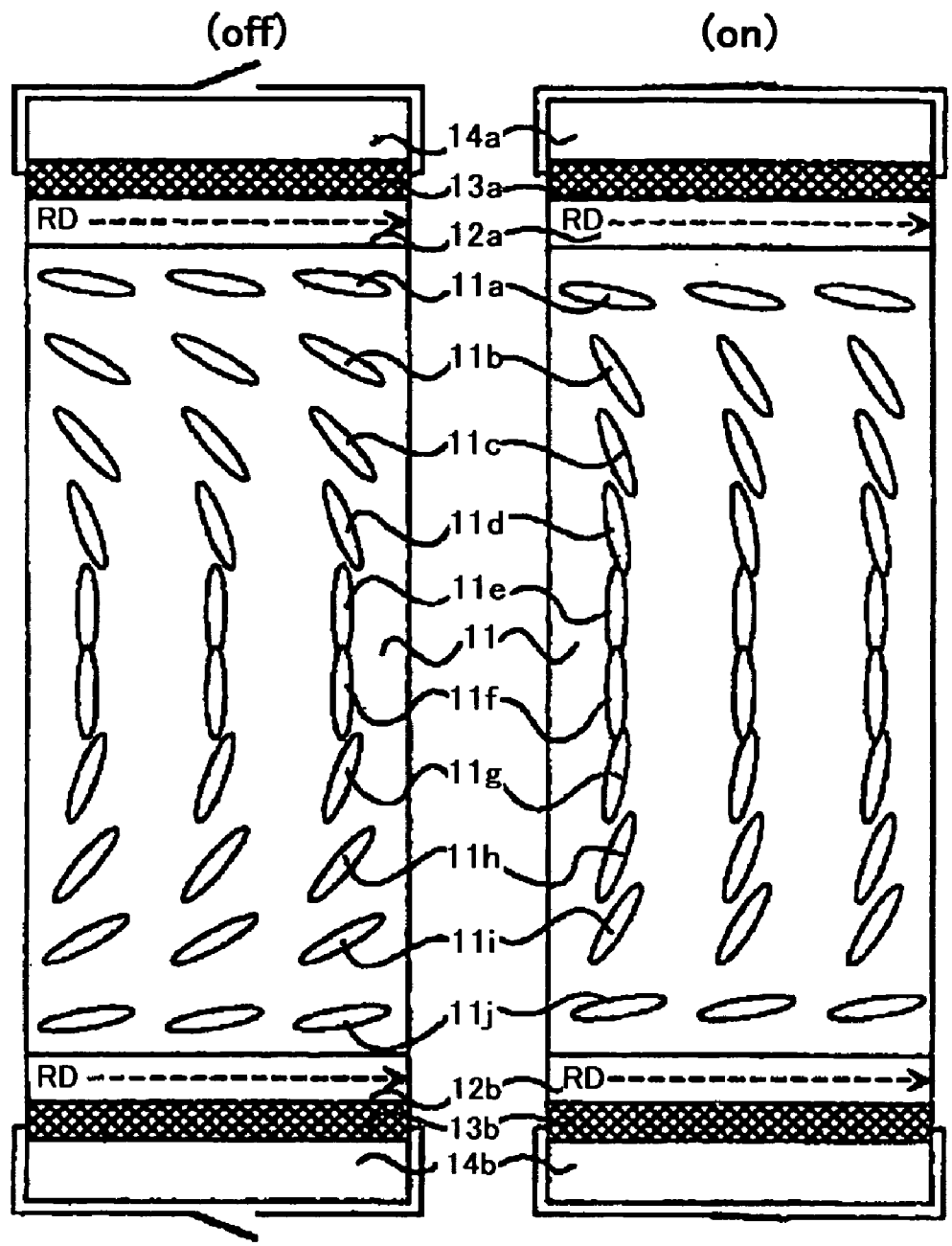
FIG. 1 is a cross-sectional drawing schematically showing the alignment of a liquid crystalline compound in a bend alignment liquid crystal cell.

Hereinafter, the content of the present invention will be described in detail. In this connection, "-" in the present description is used in such meaning that the numerical values described before and after "-" are included as the lower limit and the upper limit respectively.

Further, in the present description, Re(λ) and Rth(λ) represent in-plane retardation and retardation in a thickness direction, respectively, at a wavelength of λ. Re(λ) is measured by irradiating light having a wavelength of λ nm in a normal direction of a film in KOBRA 21ADH (manufactured by Oji Scientific Instruments). Rth(λ) is calculated by KOBRA 21ADH on the basis of retardation values measured in total 3 directions, that is, the aforementioned Re(λ), a retardation value measured by irradiating light having a wavelength of λ nm from a direction tilted by +40° relative to a film normal direction while taking an in-plane slow phase axis (judged by KOBRA 21ADH) as a tilt axis (rotation axis), and a retardation value measured by irradiating light having a wavelength of λ nm from a direction tilted by −40° relative to a film normal direction while taking an in-plane slow phase axis as a tilt axis (rotation axis), a presumptive value of an average refractive index and an input film thickness value. Here, as a presumptive value of an average refractive index, values in Polymer Handbook (JOHN WILEY & SONS, INC) and catalogs of various optical films can be used. For a material whose average refractive index is not known, it can be measured with an Abbe refractometer. Average values of refractive index of prevailing optical films are exemplified below: cellulose acylate (1.48), cycloolefin polymer (1.52), polycarbonate (1.59), polymethylmethacrylate (1.49), and polystyrene (1.59). By inputting a presumptive value of the average refractive index and a film thickness, KOBRA 21ADH calculates nx, ny and nz. From the calculated nx, ny and nz, Nz=(nx−nz)/(nx−ny) is further calculated.

(Liquid Crystal Display Device)

FIG. 1 is a cross-sectional view schematically showing alignment of a liquid crystalline compound in a bend alignment liquid crystal cell. As shown in FIG. 1, a bend alignment liquid crystal cell has such structure that a liquid crystalline compound (11) is sealed between an upside substrate (14a) and a downside substrate (14b). The liquid crystalline compound (11) for use in a bend alignment liquid crystal cell generally has a positive permittivity anisotropy. The upside substrate (14a) and the downside substrate (14b) of the liquid crystal cell have alignment films (12a, 12b) and electrode layers (13a, 13b) respectively. The alignment film has a function for aligning rod-shaped liquid crystalline compounds (11a-11j). RD is a rubbing direction of the alignment film. The electrode layer has a function for applying voltage to the rod-shaped liquid crystalline compounds (11a-11j).

When the applied voltage to the bend alignment liquid crystal cell is low, as denoted by "off" in FIG. 1, the rod-shaped liquid crystalline compounds (11a-11e) on the upper substrate (14a) side of the liquid crystal cell and the rod-shaped liquid crystalline compounds (11f-11j) on the lower substrate (14b) side align in a reverse direction (vertically symmetrically) to each other. Further, the rod-shaped liquid crystalline compounds (11a, 11b, 11i, 11j) near the substrates (14a, 14b) align in an approximately horizontal direction, and the rod-shaped liquid crystalline compounds (11d-11g) at the central region align in an approximately vertical direction, in the liquid crystal cell.

As denoted by "on" in FIG. 1, when an applied voltage is high, the rod-shaped liquid crystalline compounds (11a, 11j) near the substrates (14a, 14b) remain in an approximately horizontally aligned state. On the other hand, the rod-shaped liquid crystalline compounds (11e, 11f) at the liquid crystal cell central region remain in an approximately vertically aligned state. The rod-shaped liquid crystalline compounds whose alignment alter through the increase in the voltage are those (11b, 11c, 11d, 11g, 11h, 11i) being located in the intermediate portion between the substrate and the liquid crystal cell central region, and these align more vertically than in the "off" state. However, the state in which rod-shaped liquid crystalline compounds (11a-11e) on the upper substrate (14a) side of the liquid crystal cell and rod-shaped liquid crystalline compounds (11f-11j) on the lower substrate (14b) side align in an inverse direction (vertically symmetrically) is the same as the "off" state.

Figure 2:
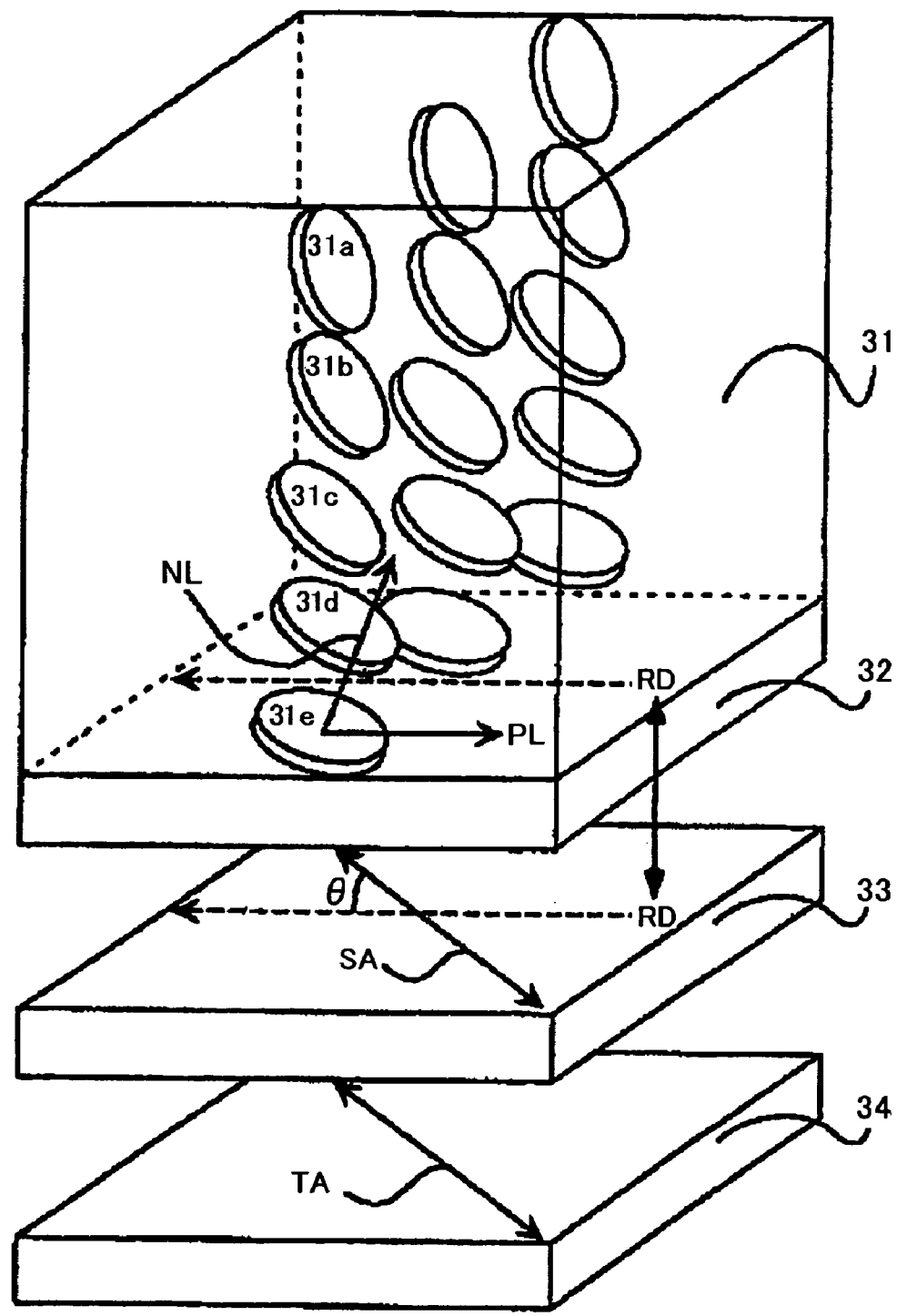
FIG. 2 is a schematic drawing showing a polarizing plate.

FIG. 2 is a schematic drawing showing a polarizing plate. The polarizing plate shown in FIG. 2 is composed of a laminated body of an optically anisotropic layer (1) (31) including discotic liquid crystalline compounds (31a-31e), an optically anisotropic layer (2) including at least one cellulose acylate film, and a polarizing film (34). The polarizing plate shown in FIG. 2 has an alignment film (32) between the optically anisotropic layer (1) (31) and the optically anisotropic layer (2) (33). The discotic liquid crystalline compounds (31a-31e) of the optically anisotropic layer (1) (31) are a planer molecule. The discotic liquid crystalline compounds (31a-31e) have only one plane, that is, discotic plane in the molecule. The discotic plane tilts relative to the plane of the optically anisotropic layer (2) (33). The angle (tilt angle) between the discotic plane and the optically anisotropic layer (2) increases along with the increase in the distance of the discotic liquid crystalline compound from the alignment film. An average tilt angle is preferably within a range of 15-50°. When the tilt angle is altered as shown in FIG. 2, a view angle-expanding function of the polarizing plate is significantly enhanced. In addition, a polarizing plate whose tilt angle has been altered also has such function as preventing reversal, graduation alteration, or coloring of displayed images. An average of directions (PL) of orthogonally projected normal lines (NL) of the discotic plane of discotic liquid crystalline compounds (31a-31e) onto the optically anisotropic layer (2) (33) is inversely parallel relative to the rubbing direction (RD) of the alignment film (32).

In a preferable embodiment of the invention, the angle between the average direction of orthogonally projected normal lines of the discotic plane of discotic liquid crystalline compounds onto the optically anisotropic layer (2) (33) and the in-plane slow phase axis (SA) of the optically anisotropic layer (2) (33) is set to substantially 45°. Consequently, in a manufacturing process of the polarizing plate, it suffices to adjust so that an angle (θ) between the rubbing direction (RD) of the alignment film (32) and the in-plane slow phase axis (SA) of the optically anisotropic layer (2) becomes substantially 45°. In the invention, furthermore, the optically anisotropic layer (2) and the polarizing film are arranged so that the in-plane slow phase axis (SA) of the optically anisotropic layer (2) and the in-plane transmission axis (TA) of the polarizing film (34) become substantially parallel or substantially vertical to each other. In the polarizing plate shown in FIG. 2, one optically anisotropic layer (2) is arranged parallel. The in-plane slow phase axis (SA) of the optically anisotropic layer (2) (33) corresponds in principle to the stretching direction of the optically anisotropic layer (2). The in-plane transmission axis (TA) of the polarizing film (34) corresponds in principle to the direction perpendicular to the stretching direction of the polarizing film.

Figure 3:
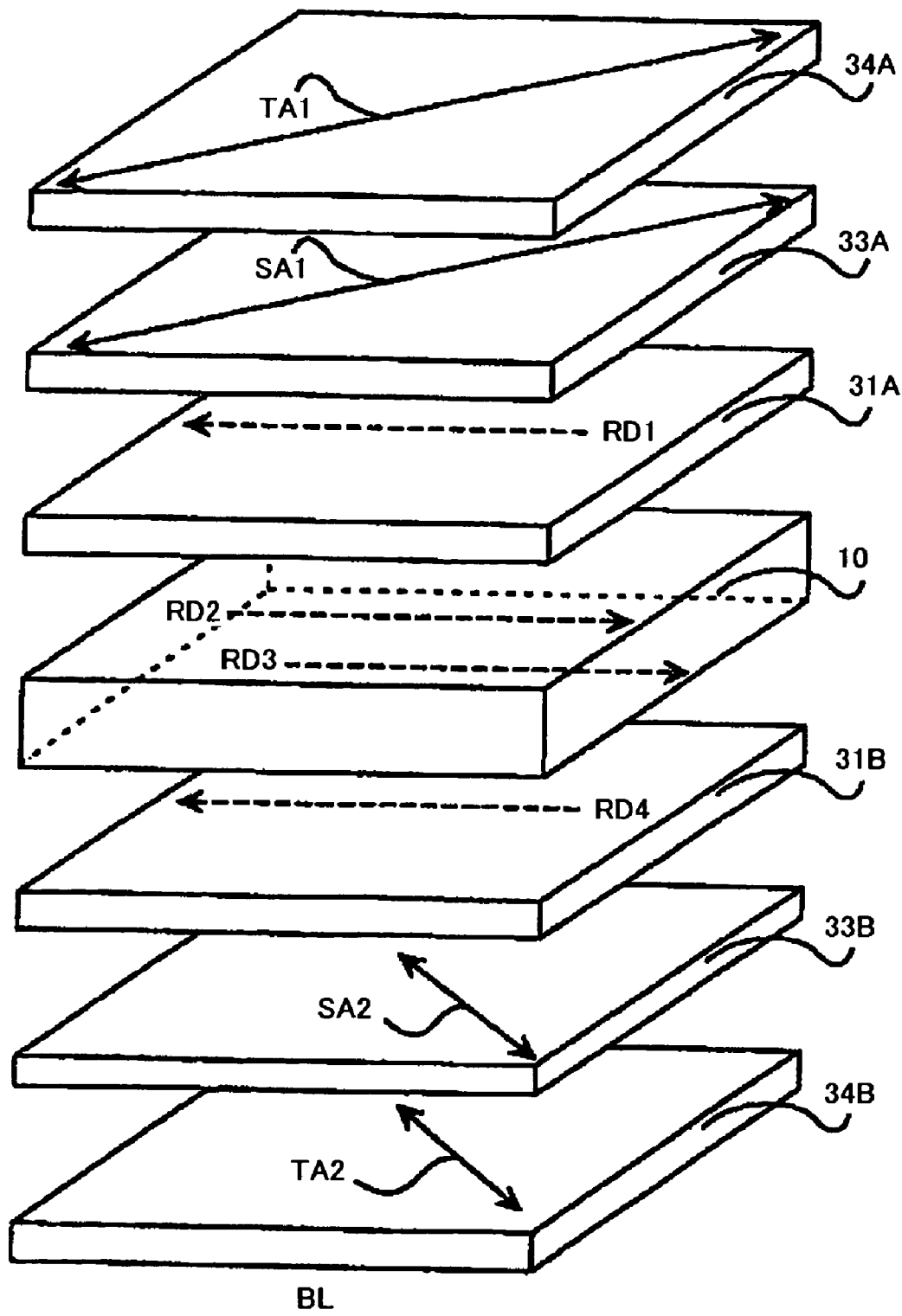
FIG. 3 is a schematic drawing showing a bend alignment type liquid crystal display device according to the present invention.

FIG. 3 is a schematic drawing showing the bend alignment type liquid crystal display device according to the invention. The liquid crystal display device shown in FIG. 3 is composed of a bend alignment liquid crystal cell (10), a pair of polarizing plates (31A, 33A, 34A, 31B, 33B, 34B) arranged on both sides of the liquid crystal cell, and a backlight (BL). The bend alignment liquid crystal cell (10) corresponds to the liquid crystal cell shown in FIG. 1. The rubbing directions (RD2, RD3) of the upper and lower sides of the liquid crystal cell (10) are the same (parallel). In the polarizing plate, the optically anisotropic layers (1) (31A, 31B), the optically anisotropic layers (2) (33A, 33B) and the polarizing films (34A, 34B) are laminated in this order from the liquid crystal cell (10) side. The rubbing directions (RD1, RD4) of the discotic liquid crystalline compound of the optically anisotropic layers (1) (31A, 31B) are inversely parallel relative to the rubbing directions (RD2, RD3) of the facing liquid crystal cell. As described above, the rubbing directions (RD1, RD4) of the discotic liquid crystalline compounds are inversely parallel to an average direction of the orthogonally projected normal line of the discotic plane onto the optically anisotropic layer (2). The in-plane slow phase axes (SA1, SA2) of the optically anisotropic layers (2) (33A, 33B) and the in-plane transmission axes (TA1, TA2) of the polarizing films (34A, 34B) substantially form an angle of 45° relative to the rubbing directions (RD1, RD4) of the discotic liquid crystalline compound in the same plane. The two polarizing films (34A, 34B) are arranged so that the in-plane transmission axes (TA1, TA2) are orthogonal to each other (crossed nicols).

(Optically Anisotropic Layer (1))

The optically anisotropic layer (1) of the invention includes a liquid crystalline compound. The optically anisotropic layer (1) may be formed directly on the surface of the optically anisotropic layer (2), or may be formed on an alignment film or the like having been formed on the optically anisotropic layer (2).

As a liquid crystalline compound for use in the optically anisotropic layer (1), either of a rod-shaped liquid crystalline compound and a discotic liquid crystalline compound can be preferably adopted, but a discotic liquid crystalline compound is preferable. A retardation value measured from the film normal direction of the optically anisotropic layer (1) is preferably 20-40 nm, and more preferably 25-40 nm.

The optically anisotropic layer (1) is preferably designed so that it compensates the liquid crystalline compound in the liquid crystal cell at the time of black level of a liquid crystal display device. With regard to an alignment state of a liquid crystalline compound in a liquid crystal cell, there is description in IDW'00, FMC7-2, P 411-414.

(Discotic Liquid Crystalline Compound)

A discotic liquid crystalline compound in the invention may be a high-molecular liquid crystal or a low-molecular liquid crystal, and, further, a cross-linked low-molecular liquid crystal that no longer shows liquid crystalline property is also included.

The discotic liquid crystalline compound in the invention includes benzene derivatives described in a study report of C. Destrade et al., Mol. Cryst. vol 71, p 111 (1981); truxene derivatives described in study reports of C. Destrade et al., Mol. Cryst, vol. 122, p 141 (1985), and Physics Lett, A, vol. 78, p 82 (1990); cyclohexane derivatives described in a study report of B. Kohne et al., Angew. Chem. vol. 96, p 70 (1984); and azacrown-based and phenylacetylene-based macrocycles described in study reports of J. M. Lehn et al., J. Chem. Commun., p 1794 (1985) and J. Zhang et al., J. Am. Chem. Soc, vol. 116, p 2655 (1994).

The above-described discotic liquid crystalline compound includes such compounds that represent liquid crystalline properties, the compound having a structure in which, to the center mother nucleus of the molecule, straight chain alkyl groups or alkoxy groups, or substituted benzoyloxy groups are radially substituted as the side chains of the mother nucleus. The preferable compound is that the molecule or the aggregate of molecules has rotational symmetric property to be capable of giving a certain alignment.

When the optically anisotropic layer (1) is formed from a discotic liquid crystalline compound, the compound finally included in the optically anisotropic layer (1) is not required anymore to show liquid crystalline property. For example, in the case where a low molecular weight discotic liquid crystalline compound has a group capable of reacting by heat or light, and the group reacts by heat or light to polymerize or cross-link and increase in a molecular weight thereof, to result in forming the optically anisotropic layer (1), the compound included in the optically anisotropic layer (1) may have already lost liquid crystalline property. Preferable examples of the discotic liquid crystalline compound are described in JP-A-8-50206. Polymerization of a discotic liquid crystalline compound is described in JP-A-8-27284.

In order to fix a discotic liquid crystalline compound by polymerization, it is necessary to bond a polymerizable group to a discotic core of the discotic liquid crystalline compound as a substituent. In this connection, a direct bonding of a polymerizable group to the discotic core makes it difficult to keep an alignment state in the polymerization reaction. Therefore, a linking group is introduced between the discotic core and the polymerizable group. Accordingly, the discotic liquid crystalline compound having a polymerizable group is preferably a compound represented by the following formula (DI).

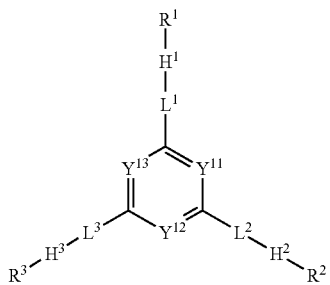

Formula (DI)

wherein $Y^{11}$, $Y^{12}$ and $Y^{13}$ each independently represents methine or a nitrogen atom.

When each of $Y^{11}$, $Y^{12}$ and $Y^{13}$ is methane, a hydrogen atom of methine may have been substituted by a substituent. Here, methine means an atom group obtained by removing 3 hydrogen atoms from methane.

Preferable examples of the substituent that may be had by the carbon atom of methine include an alkyl group, an alkoxy group, an aryloxy group, an acyl group, an alkoxycarbonyl group, an acyloxy group, an acylamino group, an alkoxycarbonylamino group, an alkylthio group, an arylthio group, a halogen atom and a cyano group. Among these substituents, an alkyl group, an alkoxy group, an alkoxycarbonyl group, an acyloxy group, a halogen atom and a cyano group are more preferable, and an alkyl group having 1-12 carbon atoms, an alkoxy group having 1-12 carbon atoms, an alkoxycarbonyl group having 2-12 carbon atoms, an acyloxy group having 2-12 carbon atoms, a halogen atom and cyano group are further preferable. More preferably each of $Y^{11}$, $Y^{12}$ and $Y^{13}$ is methine, and further preferably the methine has no substituent.

In the formula (DI), $L^1$, $L^2$ and $L^3$ each independently represents a single bond or a divalent linking group. When $L^1$, $L^2$ and $L^3$ are divalent linking groups, preferably each independently represents a divalent linking group selected from the group consisting of —O—, —S—, —C(=O)—, —NR$^7$—, —CH=CH—, —C≡C—, a divalent cyclic group and combinations of these. The $R^7$ is an alkyl group having 1-7 carbon atoms or a hydrogen atom, preferably an alkyl group having 1-4 carbon atoms or a hydrogen atom, more preferably a methyl group, an ethyl group or a hydrogen atom, and most preferably a hydrogen atom.

The divalent cyclic group in $L^1$, $L^2$ and $L^3$ means a divalent linking group having at least one type of cyclic structure (hereinafter, it may be referred to as a cyclic group). The cyclic group preferably has a 5-membered, 6-membered or 7-membered ring, more preferably a 5-membered or 6-membered ring, and further preferably a 6-membered ring. A ring included in the cyclic group may be a condensed ring, but a single ring is preferred to a condensed ring. A ring included in the cyclic group may be any of an aromatic ring, an aliphatic ring and a heterocyclic ring. Preferable examples of the aromatic ring include a benzene ring and a naphthalene ring. Preferable example of the aliphatic ring includes a cyclohexane ring. Preferable examples of the heterocyclic ring include a pyridine ring and a pyrimidine ring. As the cyclic group, an aromatic ring or a heterocyclic ring is more preferable. The cyclic group is more preferably a divalent linking group consisting of a ring structure alone (but may include a substituent).

Among the divalent cyclic groups represented by $L^1$, $L^2$ and $L^3$, as a cyclic group having a benzene ring, a 1,4-phenylene group is preferable. As a cyclic group having a naphthalene ring, a naphthalene-1,5-diyl group and a naphthalene-2,6-diyl group are preferable. As a cyclic group having a cyclohexane ring, a 1,4-cyclohexylene group is preferable. As a cyclic group having a pyridine ring, a pyridine-2,5-diyl group is preferable. As a cyclic group having a pyrimidine ring, a pyrimidine-2,5-diyl group is preferable.

The divalent cyclic group represented by $L^1$, $L^2$ and $L^3$ may have a substituent. Examples of the substituent include a halogen atom, a cyano group, a nitro group, an alkyl group having 1-16 carbon atoms, an alkenyl group having 2-16 carbon atoms, an alkynyl group having 2-16 carbon atoms, a halogen-substituted alkyl group having 1-16 carbon atoms, an alkoxy group having 1-16 carbon atoms, an acyl group having 2-16 carbon atoms, an alkylthio group having 1-16 carbon atoms, an acyloxy group having 2-16 carbon atoms, an alkoxycarbonyl group having 2-16 carbon atoms, a carbamoyl group, a carbamoyl group substituted by an alkyl group having 2-16 carbon atoms, and an acylamino group having 2-16 carbon atoms.

Preferable examples of $L^1$, $L^2$ and $L^3$ include a single bond, *—O—CO—, *—CO—O—, *—CH=CH—, *—C≡C—, *-divalent cyclic group-, *—O—CO-divalent cyclic group-, *—CO—O-divalent cyclic group-, *—CH=CH-divalent cyclic group-, *—C≡C-divalent cyclic group-, *-divalent cyclic group-O—CO—, *-divalent cyclic group-CO—O—, *-divalent cyclic group-CH=CH— and *-divalent cyclic group-C≡C—. Among these, a single bond, *—CH=CH—, *—C≡C—, *-divalent cyclic group-O—CO—, *—CH=CH-divalent cyclic group- and *—C≡C-divalent cyclic group- are more preferable, and a single bond is further preferable. Here, * represents the position to be bonded to a 6-membered ring side including $Y^{11}$, $Y^{12}$ and $Y^{13}$ in formula (DI).

$H^1$, $H^2$ and $H^3$ each independently represents the following formula (DI-A) or the following formula (DI-B).

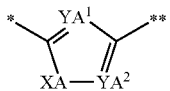

Formula (DI-A)

wherein $YA^1$ and $YA^2$ each independently represents methine or a nitrogen atom. Preferably at least one of $YA^1$ and $YA^2$ is a nitrogen atom, and more preferably both of $YA^1$ and $YA^2$ are nitrogen atoms. XA represents an oxygen atom, a sulfur atom, methylene or imino, wherein an oxygen atom is preferable. * represents a position to be bonded to $L^1$-$L^3$ sides in the formula (DI), and ** represents a position to be bonded to $R^1$-$R^3$ sides in the formula (DI). Here, imino means a group represented by —NH— (including one in which H is substituted by a substituent).

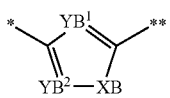

Formula (DI-B)

wherein $YB^1$ and $YB^2$ each independently represents methine or a nitrogen atom. Preferably at least one of $YB^1$ and $YB^2$ is a nitrogen atom, and more preferably both are nitrogen atoms. XB represents an oxygen atom, a sulfur atom, methylene or imino, wherein an oxygen atom is preferable. * represents the position to be bonded to $L^1$-$L^3$ sides in the formula (DI), and ** represents the position to be bonded to $R^1$-$R^3$ sides in the formula (DI).

$R^1$, $R^2$ and $R^3$ each independently represents the following formula (DI-R).

*-(-$L^{21}$-$Q^2$)$_{n1}$-$L^{22}$-$L^{23}$-$Q^1$   Formula (DI-R):

wherein * represents the position to be bonded to $H^1$-$H^3$ sides in the formula (DI).

$L^{21}$ is a single bond or a divalent linking group. When $L^{21}$ is a divalent linking group, it is preferably a divalent linking group selected from the group consisting of —O—, —S—, —C(=O)—, —$NR^7$—, —CH=CH—, —C≡C— and combinations of these. $R^7$ is an alkyl group having 1-7 carbon atoms or a hydrogen atom, preferably an alkyl group having 1-4 carbon atoms or a hydrogen atom, more preferably a methyl group, an ethyl group or a hydrogen atom, and most preferably a hydrogen atom.

$L^{21}$ is preferably any one of a single bond, *—O—CO—, *—CO—O—, *—CH=CH— and *—C≡C— (here, *** represents the * side in the formula (DI-R)), and more preferably a single bond.

$Q^2$ represents a divalent group (cyclic group) having at least one type of a cyclic structure. With regard to such cyclic group, a cyclic group having a 5-membered, 6-membered or 7-membered ring is preferable, a cyclic group having a 5-membered or 6-membered ring is more preferable, and a cyclic group having a 6-membered ring is further preferable. The ring included in the cyclic group may be a condensed ring, but a single ring is preferred to a condensed ring. Further, a ring included in the cyclic group may be any one of an aromatic ring, an aliphatic ring and a heterocyclic ring. Preferable examples of the aromatic ring include a benzene ring and a naphthalene ring. Preferable example of the aliphatic ring includes a cyclohexane ring. Preferable examples of the heterocyclic ring include a pyridine ring and a pyrimidine ring. As the cyclic group, an aromatic ring or a heterocyclic ring is more preferable. The cyclic group is more preferably a divalent linking group consisting of a ring structure alone (but may include a substituent).

Among the above-described $Q^2$, as a cyclic group having a benzene ring, a 1,4-phenylene group is preferable. As a cyclic group having a naphthalene ring, a naphthalene-1,5-diyl group and a naphthalene-2,6-diyl group are preferable. As a cyclic group having a cyclohexane ring, a 1,4-cyclohexylene group is preferable. As a cyclic group having a pyridine ring, a pyridine-2,5-diyl group is preferable. As a cyclic group having a pyrimidine ring, a pyrimidine-2,5-diyl group is preferable. Among these, in particular, a 1,4-phenylene group and a 1,4-cyclohexylene group are preferable.

$Q^2$ may have a substituent. Examples of the substituent include a halogen atom (fluorine atom, chlorine atom, bromine atom, iodine atom), a cyano group, a nitro group, an alkyl group having 1-16 carbon atoms, an alkenyl group having 2-16 carbon atoms, an alkynyl group having 2-16 carbon atoms, a halogen-substituted alkyl group having 1-16 carbon atoms, an alkoxy group having 1-16 carbon atoms, an acyl group having 2-16 carbon atoms, an alkylthio group having 1-16 carbon atoms, an acyloxy group having 2-16 carbon atoms, an alkoxycarbonyl group having 2-16 carbon atoms, a carbamoyl group, a carbamoyl group substituted by an alkyl group having 2-16 carbon atoms and an acylamino group having 2-16 carbon atoms. Among these, a halogen atom, a cyano group, an alkyl group having 1-6 carbon atoms and a halogen-substituted alkyl group having 1-6 carbon atoms are preferable, a halogen atom, an alkyl group having 1-4 carbon atoms and a halogen-substituted alkyl group having 1-4 carbon atoms are more preferable, and a halogen atom, an alkyl group having 1-3 carbon atoms and a trifluoromethyl group are further preferable.

n1 represents 0 or an integer of 1-4. As n1, an integer of 1-3 is preferable, and 1 or 2 is more preferable.

$L^{22}$ represents —O—, —O—CO—, —CO—O—, —O—CO—O—, **—S—, *—N(R)—, —$CH_2$—, —CH=CH— or —C≡C—, and  represents the position to be bonded to the $Q^2$ side.

$L^{22}$ is preferably —O—, —O—CO—, —CO—O—, —O—CO—O—, —$CH_2$—, —CH=CH— or —C≡C—, and more preferably —O—, —O—CO—, —O—CO—O— or **—$CH_2$—.

$L^{23}$ represents a divalent linking group selected from the group consisting of —O—, —S—, —C(=O)—, —NH—, —$CH_2$—, —CH=CH—, —C≡C— and combinations of these. Here, a hydrogen atom of —NH—, —$CH_2$— and —CH=CH— may be substituted by a substituent. Preferable examples of the substituent include a halogen atom, a cyano group, a nitro group, an alkyl group having 1-6 carbon atoms, a halogen-substituted alkyl group having 1-6 carbon atoms, an alkoxy group having 1-6 carbon atoms, an acyl group having 2-6 carbon atoms, an alkylthio group having 1-6 carbon atoms, an acyloxy group having 2-6 carbon atoms, an alkoxycarbonyl group having 2-6 carbon atoms, a carbamoyl group, a carbamoyl group substituted by an alkyl having 2-6 carbon atoms and an acylamino group having 2-6 carbon atoms, and more preferable ones include a halogen atom and an alkyl group having 1-6 carbon atoms.

$L^{23}$ is preferably selected from the group consisting of —O—, —C(=O)—, —$CH_2$—, —CH=CH—, —C≡C— and combinations of these. $L^{23}$ preferably contains 1-20 carbon atoms, and more preferably 2-14 carbon atoms. Further, $L^{23}$ preferably contains 1-16 —$CH_2$—, and more preferably 2-12 —$CH_2$—.

$Q^1$ represents a polymerizable group or a hydrogen atom. When the liquid crystalline compound used in the invention is used for an optical film and the like wherein magnitude of retardation preferably does not alter by heat, $Q^1$ is preferably a polymerizable group. The polymerization reaction is preferably addition polymerization (including ring-opening polymerization) or condensation polymerization. That is, the polymerizable group is preferably a functional group capable of an addition polymerization reaction or a condensation polymerization reaction. Examples of the polymerizable group are shown below.

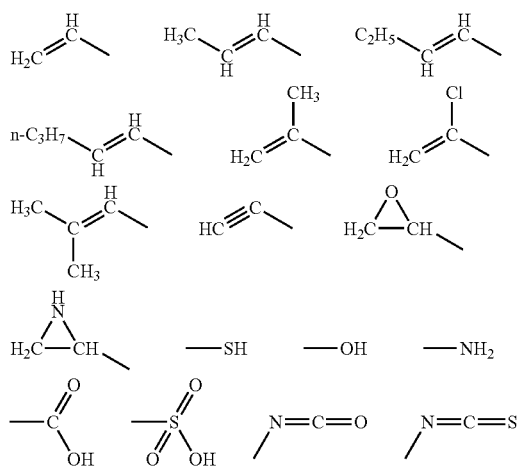

Further, the polymerizable group is particularly preferably a functional group capable of an addition polymerization reaction. Preferable examples of the polymerizable group include a polymerizable ethylenic unsaturated group and a ring-opening polymerizable group.

Examples of the polymerizable ethylenic unsaturated group include the following formulae (M-1)-(M-6).

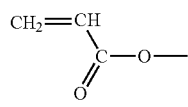 (M-1)

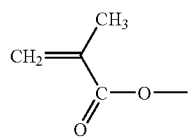 (M-2)

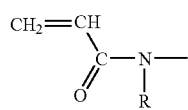 (M-3)

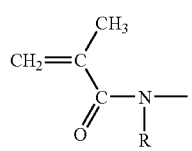 (M-4)

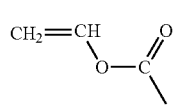 (M-5)

-continued

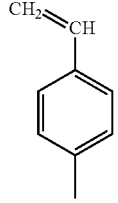 (M-6)

In formulae (M-3), (M-4), R represents a hydrogen atom or an alkyl group, wherein a hydrogen atom or a methyl group is preferable.

Among the formulae (M-1)-(M-6), (M-1) or (M-2) is preferable, and (M-1) is more preferable.

The ring-opening polymerizable group is preferably a cyclic ether group, more preferably an epoxy group or an oxetanyl group, and most preferably an epoxy group.

As the liquid crystalline compound for use in the invention, a liquid crystalline compound represented by the following formula (DII) is particularly preferable.

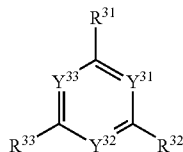

Formula (DII)

wherein $Y^{31}$, $Y^{32}$ and $Y^{33}$ each independently represents methine or a nitrogen atom, having the same meaning and also the same preferable range as $Y^{11}$, $Y^{12}$ and $Y^{13}$ in the formula (DI).

In the formula (DII), $R^{31}$, $R^{32}$ and $R^{33}$ each independently represents the following formula (DII-R).

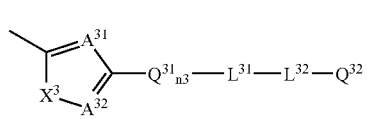

Formula (DII-R)

wherein $A^{31}$ and $A^{32}$ each independently represents methine or a nitrogen atom, wherein preferably at least one is a nitrogen atom, and more preferably both are nitrogen atoms. $X^3$ represents an oxygen atom, a sulfur atom, methylene or imino, wherein an oxygen atom is preferable.

$Q^{31}$ represents a divalent linking group having a 6-membered cyclic structure (hereinafter, it may be referred to as a 6-membered cyclic group). The 6-membered ring may be a condensed ring, but a single ring is more preferred to a condensed ring. Further, a ring included in a 6-membered cyclic group may be any one of an aromatic ring, an aliphatic ring and a heterocyclic ring. Preferable examples of the aromatic ring include a benzene ring and a naphthalene ring. A preferable example of the aliphatic ring includes a cyclohexane ring. Preferable examples of the heterocyclic ring include a pyridine ring and a pyrimidine ring. $Q^{31}$ is preferably a divalent linking group consisting of a 6-membered cyclic structure alone (but it may have a substituent).

Among $Q^{31}$, as a 6-membered cyclic group having a benzene ring, a 1,4-phenylene group and a 1,3-phenylene group are preferable. As a ring structure having a naphthalene ring, a naphthalene-1,5-diyl group and a naphthalene-2,6-diyl group are preferable. As a ring structure having a cyclohexane ring, a 1,4-cyclohexylene group is preferable. As a ring structure having a pyridine ring, a pyridine-2,5-diyl group is preferable. As a ring structure having a pyrimidine ring, a pyrimidine-2,5-diyl group is preferable. Among these, in particular, a 1,4-phenylene group and a 1,3-phenylene group are more preferable.

The ring structure of $Q^{31}$ may have a substituent. Examples of the substituent include a halogen atom (fluorine atom, chlorine atom, bromine atom, iodine atom), a cyano group, a nitro group, an alkyl group having 1-16 carbon atoms, an alkenyl group having 2-16 carbon atoms, an alkynyl group having 2-16 carbon atoms, a halogen atom-substituted alkyl group having 1-16 carbon atoms, an alkoxy group having 1-16 carbon atoms, an acyl group having 2-16 carbon atoms, an alkylthio group having 1-16 carbon atoms, an acyloxy group having 2-16 carbon atoms, an alkoxycarbonyl group having 2-16 carbon atoms, a carbamoyl group, a carbamoyl group substituted by an alkyl having 2-16 carbon atoms and an acylamino group having 2-16 carbon atoms. As a substituent for a 6-membered cyclic group, a halogen atom, a cyano group, an alkyl group having 1-6 carbon atoms or a halogen atom-substituted alkyl group having 1-6 carbon atoms is preferable, a halogen atom, an alkyl group having 1-4 carbon atoms or a halogen atom-substituted alkyl group having 1-4 carbon atoms is more preferable, and a halogen atom, an alkyl group having 1-3 carbon atoms or a trifluoromethyl group is further preferable.

n3 represents an integer of 1-3, wherein 1 or 2 is preferable.

$L^{31}$ represents *—O—, *—O—CO—, *—CO—O—, *—O—CO—O—, *—S—, —N(R)—, *—CH$_2$—, *—CH=CH— or *—C≡C—, * represents the position to be bonded to the $Q^{31}$ side, specifically having the same meaning and also the same preferable range as $L^{22}$ in the formula (DI-R).

$L^{32}$ represents a divalent linking group selected from the group consisting of —O—, —S—, —C(=O)—, —NH—, —CH$_2$—, —CH=CH—, —C≡C— and combination of these, specifically having the same meaning and also the same preferable range as $L^{23}$ in the formula (DI-R).

$Q^{32}$ in the formula (DII-R) represents a polymerizable group or a hydrogen atom, specifically having the same meaning and also the preferable range as $Q^1$ in the formula (DI-R).

Specific examples of the liquid crystalline compound represented by the formula (DI) are shown below. However, the invention is not intended to be restricted to these.

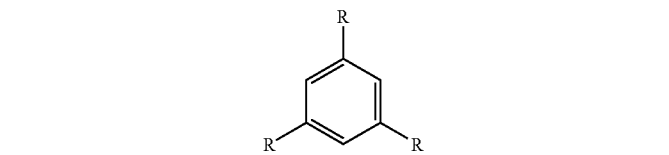

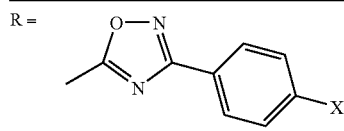

X =   —OC$_4$H$_9$                D-1

—OC$_5$H$_{11}$                D-2
—OC$_6$H$_{13}$                D-3
—OC$_7$H$_{15}$                D-4
—OC$_8$H$_{17}$                D-5
—OCH$_2$CH(CH$_3$)C$_4$H$_9$   D-6
—O(CH$_2$)$_2$OCOCH=CH$_2$     D-7
—O(CH$_2$)$_3$OCOCH=CH$_2$     D-8
—O(CH$_2$)$_4$OCOCH=CH$_2$     D-9
—O(CH$_2$)$_5$OCOCH=CH$_2$     D-10
—O(CH$_2$)$_6$OCOCH=CH$_2$     D-11
—O(CH$_2$)$_7$OCOCH=CH$_2$     D-12
—O(CH$_2$)$_8$OCOCH=CH$_2$     D-13
—O(CH$_2$)$_2$CH(CH$_3$)OCOCH=CH$_2$  D-14
—O(CH$_2$)$_3$CH(CH$_3$)OCPCH=CH$_2$  D-15
—O(CH$_2$CH$_2$O)CHOCH=CH$_2$  D-16

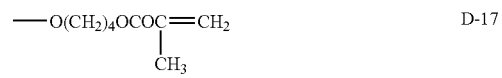  D-17

—O(CH$_2$)$_4$OCOCH=CHCH$_3$   D-18
—OCH=CH$_2$                    D-19

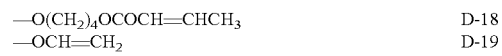  D-20

—OCOC$_4$H$_9$                 D-21
—OCOC$_5$H$_{11}$              D-22
—OCOC$_6$H$_{13}$              D-23
—OCO(CH$_2$)$_2$OCOCH=CH$_2$   D-24

-continued

| | |
|---|---|
| —OCO(CH₂)₃OCOCH=CH₂ | D-25 |
| —OCO(CH₂)₄OCOCH=CH₂ | D-26 |
| —OCO(CH₂)₅OCOCH=CH₂ | D-27 |
| —OCO(CH₂)₆OCOCH=CH₂ | D-28 |
| —OCO(CH₂)₇OCOCH=CH₂ | D-29 |
| —OCO(CH₂)₂CH(CH₃)OCOCH=CH₂ | D-30 |
| —OCO(CH₂)₂OCOC(CH₃)=CH₂ | D-31 |
| —OCO(CH₂)₂OCOCH=CHCH₃ | D-32 |
| —OCO(CH₂)₄OCH=CH₂ | D-33 |
| —OCO(CH₂)₄—CH—CH₂ (epoxide) | D-34 |
| —OCOOC₄H₉ | D-35 |
| —OCOOC₅H₁₁ | D-36 |
| —OCOOC₆H₁₃ | D-37 |
| —OCOO(CH₂)₂OCOCH=CH₂ | D-38 |
| —OCOO(CH₂)₃OCOCH=CH₂ | D-39 |
| —OCOO(CH₂)₄OCOCH=CH₂ | D-40 |
| —OCOO(CH₂)₅OCOCH=CH₂ | D-41 |
| —OCOO(CH₂)₆OCOCH=CH₂ | D-42 |
| —OCOO(CH₂)₇OCOCH=CH₂ | D-43 |
| —OCOOCH(CH₃)CH₂CH₂OCOCH=CH₂ | D-44 |
| —OCOOCH(CH₂CH₂O)₂COCH=CH₂ | D-45 |
| —OCOO(CH₂)₂OCOC(CH₃)=CH₂ | D-46 |
| —OCOO(CH₂)₂OCOCH=CHCH₃ | D-47 |
| —OCOO(CH₂)₄OCH=CH₂ | D-48 |
| —OCOO(CH₂)₄—CH—CH₂ (epoxide) | D-49 |

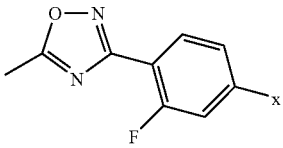

| X = | |
|---|---|
| —OC₄H₉ | D-50 |
| —OC₅H₁₁ | D-51 |
| —OC₆H₁₃ | D-52 |
| —OC₇H₁₅ | D-53 |
| —OC₈H₁₇ | D-54 |
| —OCH₂CH(CH₃)C₄H₉ | D-55 |
| —O(CH₂)₂OCOCH=CH₂ | D-56 |
| —O(CH₂)₃OCOCH=CH₂ | D-57 |
| —O(CH₂)₄OCOCH=CH₂ | D-58 |
| —O(CH₂)₅OCOCH=CH₂ | D-59 |
| —O(CH₂)₆OCOCH=CH₂ | D-60 |
| —O(CH₂)₇OCOCH=CH₂ | D-61 |
| —O(CH₂)₈OCOCH=CH₂ | D-62 |
| —O(CH₂)₂CH(CH₃)OCOCH=CH₂ | D-63 |
| —O(CH₂)₃CH(CH₃)OCOCH=CH₂ | D-64 |
| —O(CH₂CH₂O)₂COCH=CH₂ | D-65 |
| —O(CH₂)₄OCOC(CH₃)=CH₂ | D-66 |
| —O(CH₂)₄OCOCH=CHCH₃ | D-67 |
| —O(CH₂)₄OCH=CH₂ | D-68 |
| —O(CH₂)₄—CH—CH₂ (epoxide) | D-69 |
| —OCOC₄H₉ | D-70 |

-continued

| | |
|---|---|
| —OCOC$_5$H$_{11}$ | D-71 |
| —OCOC$_6$H$_{13}$ | D-72 |
| —OCO(CH$_2$)$_2$OCOCH=CH$_2$ | D-73 |
| —OCO(CH$_2$)$_3$OCOCH=CH$_2$ | D-74 |
| —OCO(CH$_2$)$_4$OCOCH=CH$_2$ | D-75 |
| —OCO(CH$_2$)$_5$OCOCH=CH$_2$ | D-76 |
| —OCO(CH$_2$)$_6$OCOCH=CH$_2$ | D-77 |
| —OCO(CH$_2$)$_7$OCOCH=CH$_2$ | D-78 |
| —OCO(CH$_2$)$_2$CH(CH$_3$)OCOCH=CH$_2$ | D-79 |
| —OCO(CH$_2$)$_2$OCOC(CH$_3$)=CH$_2$ | D-80 |
| —OCO(CH$_2$)$_2$OCOCH=CHCH$_3$ | D-81 |
| —OCO(CH$_2$)$_4$OCH=CH$_2$ | D-82 |
| —OCO(CH$_2$)$_4$—CH—CH$_2$ (epoxide) | D-83 |
| —OCOOC$_4$H$_9$ | D-84 |
| —OCOOC$_5$H$_{11}$ | D-85 |
| —OCOOC$_6$H$_{13}$ | D-86 |
| —OCOO(CH$_2$)$_2$OCOCH=CH$_2$ | D-87 |
| —OCOO(CH$_2$)$_3$OCOCH=CH$_2$ | D-88 |
| —OCOO(CH$_2$)$_4$OCOCH=CH$_2$ | D-89 |
| —OCOO(CH$_2$)$_5$OCOCH=CH$_2$ | D-90 |
| —OCOO(CH$_2$)$_6$OCOCH=CH$_2$ | D-91 |
| —OCOO(CH$_2$)$_7$OCOCH=CH$_2$ | D-92 |
| —OCOOCH(CH$_3$)CH$_2$CH$_2$OCOCH=CH$_2$ | D-93 |
| —OCOOCH(CH$_2$CH$_2$O)$_2$COCH=CH$_2$ | D-94 |
| —OCOO(CH$_2$)$_2$OCOC(CH$_3$)=CH$_2$ | D-95 |
| —OCOO(CH$_2$)$_2$OCOCH=CHCH$_3$ | D-96 |
| —OCOO(CH$_2$)$_4$OCH=CH$_2$ | D-97 |
| —OCOO(CH$_2$)$_4$—CH—CH$_2$ (epoxide) | D-98 |

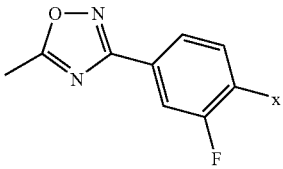

R = 3-(4-X-3-fluorophenyl)-5-methyl-1,2,4-oxadiazole

| X = —OC$_4$H$_9$ | D-99 |
|---|---|
| —OC$_5$H$_{11}$ | D-100 |
| —OC$_6$H$_{13}$ | D-101 |
| —OC$_7$H$_{15}$ | D-102 |
| —OC$_8$H$_{17}$ | D-103 |
| —OCH$_2$CH(CH$_3$)C$_4$H$_9$ | D-104 |
| —O(CH$_2$)$_2$OCOCH=CH$_2$ | D-105 |
| —O(CH$_2$)$_3$OCOCH=CH$_2$ | D-106 |
| —O(CH$_2$)$_4$OCOCH=CH$_2$ | D-107 |
| —O(CH$_2$)$_5$OCOCH=CH$_2$ | D-108 |
| —O(CH$_2$)$_6$OCOCH=CH$_2$ | D-109 |
| —O(CH$_2$)$_7$OCOCH=CH$_2$ | D-110 |
| —O(CH$_2$)$_8$OCOCH=CH$_2$ | D-111 |
| —O(CH$_2$)$_2$CH(CH$_3$)OCOCH=CH$_2$ | D-112 |
| —O(CH$_2$)$_3$CH(CH$_3$)OCOCH=CH$_2$ | D-113 |
| —O(CH$_2$CH$_2$O)$_2$COCH=CH$_2$ | D-114 |
| —O(CH$_2$)$_4$OCOC(CH$_3$)=CH$_2$ | D-115 |
| —O(CH$_2$)$_4$OCOCH=CHCH$_3$ | D-116 |
| —O(CH$_2$)$_4$OCH=CH$_2$ | D-117 |

-continued

|   |   |   |
|---|---|---|
| | —O(CH₂)₄—CH—CH₂ (epoxide) | D-118 |
| | —OCOC₄H₉ | D-119 |
| | —OCOC₅H₁₁ | D-120 |
| | —OCOC₆H₁₃ | D-121 |
| | —OCO(CH₂)₂OCOCH=CH₂ | D-122 |
| | —OCO(CH₂)₃OCOCH=CH₂ | D-123 |
| | —OCO(CH₂)₄OCOCH=CH₂ | D-124 |
| | —OCO(CH₂)₅OCOCH=CH₂ | D-125 |
| | —OCO(CH₂)₆OCOCH=CH₂ | D-126 |
| | —OCO(CH₂)₇OCOCH=CH₂ | D-127 |
| | —OCO(CH₂)₂CH(CH₃)OCOCH=CH₂ | D-128 |
| | —OCO(CH₂)₂OCOC(CH₃)=CH₂ | D-129 |
| | —OCO(CH₂)₂OCOCH=CHCH₃ | D-130 |
| | —OCO(CH₂)₄OCH=CH₂ | D-131 |
| | —OCO(CH₂)₄—CH—CH₂ (epoxide) | D-132 |
| | —OCOOC₄H₉ | D-133 |
| | —OCOOC₅H₁₁ | D-134 |
| | —OCOOC₆H₁₃ | D-135 |
| | —OCOO(CH₂)₂OCOCH=CH₂ | D-136 |
| | —OCOO(CH₂)₃OCOCH=CH₂ | D-137 |
| | —OCOO(CH₂)₄OCOCH=CH₂ | D-138 |
| | —OCOO(CH₂)₅OCOCH=CH₂ | D-139 |
| | —OCOO(CH₂)₆OCOCH=CH₂ | D-140 |
| | —OCOO(CH₂)₇OCOCH=CH₂ | D-141 |
| | —OCOOCH(CH₃)CH₂CH₂OCOCH=CH₂ | D-142 |
| | —OCOOCH(CH₂CH₂O)₂COCH=CH₂ | D-143 |
| | —OCOO(CH₂)₂OCOC(CH₃)=CH₂ | D-144 |
| | —OCOO(CH₂)₂OCOCH=CHCH₃ | D-145 |
| | —OCOO(CH₂)₄OCH=CH₂ | D-146 |
| | —OCOO(CH₂)₄—CH—CH₂ (epoxide) | D-147 |

R = 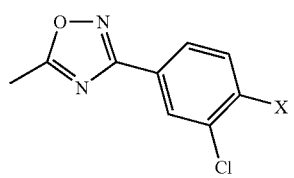 (5-methyl-1,2,4-oxadiazol-3-yl phenyl with Cl)

| | X = —OC₆H₁₃ | D-148 |
|---|---|---|
| | —OCOC₅H₁₁ | D-149 |
| | —OCOOC₄H₉ | D-150 |
| | —O(CH₂)₄OCOCH=CH₂ | D-151 |
| | —O(CH₂)₆OCOCH=CH₂ | D-152 |
| | —OCO(CH₂)₃OCOCH=CH₂ | D-153 |
| | —OCO(CH₂)₄OCOCH=CH₂ | D-154 |
| | —OCOO(CH₂)₂OCOCH=CH₂ | D-155 |
| | —OCOO(CH₂)₄OCOCH=CH₂ | D-156 |

R = 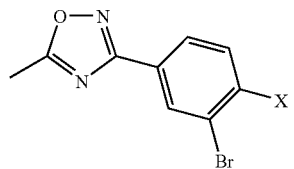 (5-methyl-1,2,4-oxadiazol-3-yl phenyl with Br)

| | X = —OC₆H₁₃ | D-157 |

-continued

| | | |
|---|---|---|
| | —OCOC$_5$H$_{11}$ | D-158 |
| | —OCOOC$_4$H$_9$ | D-159 |
| | —O(CH$_2$)$_4$OCOCH=CH$_2$ | D-160 |
| | —O(CH$_2$)$_6$OCOCH=CH$_2$ | D-161 |
| | —OCO(CH$_2$)$_3$OCOCH=CH$_2$ | D-162 |
| | —OCO(CH$_2$)$_4$OCOCH=CH$_2$ | D-163 |
| | —OCOO(CH$_2$)$_2$OCOCH=CH$_2$ | D-164 |
| | —OCOO(CH$_2$)$_4$OCOCH=CH$_2$ | D-165 |
| R = 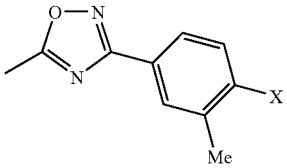 | X = —OC$_6$H$_{13}$ | D-166 |
| | —OCOC$_5$H$_{11}$ | D-167 |
| | —OCOOC$_4$H$_9$ | D-168 |
| | —O(CH$_2$)$_4$OCOCH=CH$_2$ | D-169 |
| | —O(CH$_2$)$_6$OCOCH=CH$_2$ | D-170 |
| | —OCO(CH$_2$)$_3$OCOCH=CH$_2$ | D-171 |
| | —OCO(CH$_2$)$_4$OCOCH=CH$_2$ | D-172 |
| | —OCOO(CH$_2$)$_2$OCOCH=CH$_2$ | D-173 |
| | —OCOO(CH$_2$)$_4$OCOCH=CH$_2$ | D-174 |
| R = 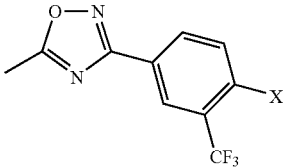 | X = —OC$_6$H$_{13}$ | D-175 |
| | —OCOC$_5$H$_{11}$ | D-176 |
| | —OCOOC$_4$H$_9$ | D-178 |
| | —O(CH$_2$)$_4$OCOCH=CH$_2$ | D-179 |
| | —O(CH$_2$)$_6$OCOCH=CH$_2$ | D-180 |
| | —OCO(CH$_2$)$_3$OCOCH=CH$_2$ | D-181 |
| | —OCO(CH$_2$)$_4$OCOCH=CH$_2$ | D-182 |
| | —OCOO(CH$_2$)$_2$OCOCH=CH$_2$ | D-183 |
| | —OCOO(CH$_2$)$_4$OCOCH=CH$_2$ | D-184 |
| R = 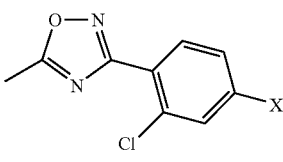 | X = —OC$_6$H$_{13}$ | D-185 |
| | —OCOC$_5$H$_{11}$ | D-186 |
| | —OCOOC$_4$H$_9$ | D-187 |
| | —O(CH$_2$)$_4$OCOCH=CH$_2$ | D-188 |
| | —O(CH$_2$)$_6$OCOCH=CH$_2$ | D-189 |
| | —OCO(CH$_2$)$_3$OCOCH=CH$_2$ | D-190 |
| | —OCO(CH$_2$)$_4$OCOCH=CH$_2$ | D-191 |
| | —OCOO(CH$_2$)$_2$OCOCH=CH$_2$ | D-192 |
| | —OCOO(CH$_2$)$_4$OCOCH=CH$_2$ | D-193 |
| R = 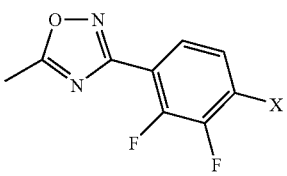 | X = —OC$_6$H$_{13}$ | D-194 |
| | —OCOC$_5$H$_{11}$ | D-195 |
| | —OCOOC$_4$H$_9$ | D-196 |
| | —O(CH$_2$)$_4$OCOCH=CH$_2$ | D-197 |
| | —O(CH$_2$)$_6$OCOCH=CH$_2$ | D-198 |
| | —OCO(CH$_2$)$_3$OCOCH=CH$_2$ | D-199 |
| | —OCO(CH$_2$)$_4$OCOCH=CH$_2$ | D-200 |

-continued

| | | |
|---|---|---|
| | —OCOO(CH₂)₂OCOCH=CH₂ | D-201 |
| | —OCOO(CH₂)₄OCOCH=CH₂ | D-202 |

R = 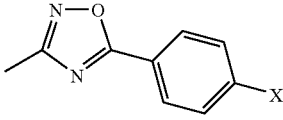   X = —OC₆H₁₃   D-203

| | | |
|---|---|---|
| | —OCOC₅H₁₁ | D-204 |
| | —OCOOC₄H₉ | D-205 |
| | —O(CH₂)₄OCOCH=CH₂ | D-206 |
| | —O(CH₂)₆OCOCH=CH₂ | D-207 |
| | —OCO(CH₂)₃OCOCH=CH₂ | D-208 |
| | —OCO(CH₂)₄OCOCH=CH₂ | D-209 |
| | —OCOO(CH₂)₂OCOCH=CH₂ | D-210 |
| | —OCOO(CH₂)₄OCOCH=CH₂ | D-211 |

R = 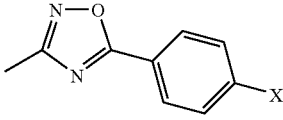   X = —OC₆H₁₃   D-212

| | | |
|---|---|---|
| | —OCOC₅H₁₁ | D-213 |
| | —OCOOC₄H₉ | D-214 |
| | —O(CH₂)₄OCOCH=CH₂ | D-215 |
| | —O(CH₂)₆OCOCH=CH₂ | D-216 |
| | —OCO(CH₂)₃OCOCH=CH₂ | D-217 |
| | —OCO(CH₂)₄OCOCH=CH₂ | D-218 |
| | —OCOO(CH₂)₂OCOCH=CH₂ | D-219 |
| | —OCOO(CH₂)₄OCOCH=CH₂ | D-220 |

R = 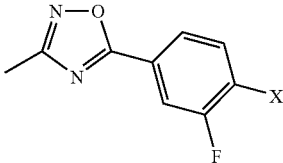   X = —OC₆H₁₃   D-221

| | | |
|---|---|---|
| | —OCOC₅H₁₁ | D-222 |
| | —OCOOC₄H₉ | D-223 |
| | —O(CH₂)₆OCOCH=CH₂ | D-224 |
| | —OCO(CH₂)₃OCOCH=CH₂ | D-225 |
| | —OCOO(CH₂)₄OCOCH=CH₂ | D-226 |

R = 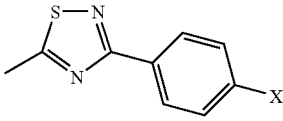   X = —OC₆H₁₃   D-227

| | | |
|---|---|---|
| | —OCOC₅H₁₁ | D-228 |
| | —OCOOC₄H₉ | D-229 |
| | —O(CH₂)₆OCOCH=CH₂ | D-230 |
| | —OCO(CH₂)₃OCOCH=CH₂ | D-231 |
| | —OCOO(CH₂)₄OCOCH=CH₂ | D-232 |

R = 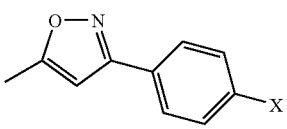   X = —OC₆H₁₃   D-233

| | | |
|---|---|---|
| | —OCOC₅H₁₁ | D-234 |
| | —OCOOC₄H₉ | D-235 |
| | —O(CH₂)₆OCOCH=CH₂ | D-236 |
| | —OCO(CH₂)₃OCOCH=CH₂ | D-237 |
| | —OCOO(CH₂)₄OCOCH=CH₂ | D-238 |

R = 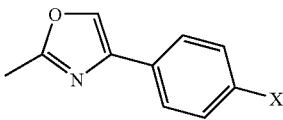   —O(CH₂)₆OCOCH=CH₂   D-239

-continued
| R = 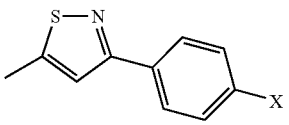 | —O(CH$_2$)$_6$OCOCH=CH$_2$ | D-240 |
| R = 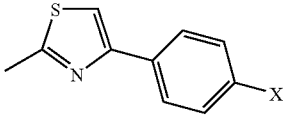 | —O(CH$_2$)$_6$OCOCH=CH$_2$ | D-241 |
| R = 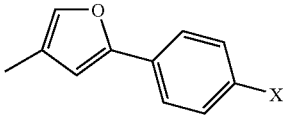 | —O(CH$_2$)$_6$OCOCH=CH$_2$ | D-242 |
| R = 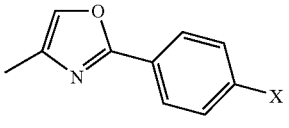 | —O(CH$_2$)$_6$OCOCH=CH$_2$ | D-243 |
| R = 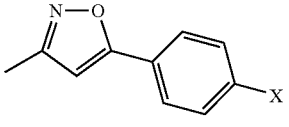 | —O(CH$_2$)$_6$OCOCH=CH$_2$ | D-244 |
| R = 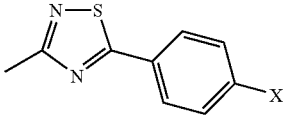 | —O(CH$_2$)$_6$OCOCH=CH$_2$ | D-245 |
| R = 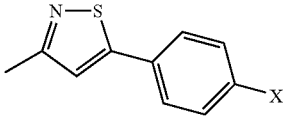 | —O(CH$_2$)$_6$OCOCH=CH$_2$ | D-246 |
| R = 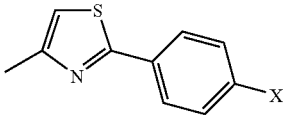 | —O(CH$_2$)$_6$OCOCH=CH$_2$ | D-247 |
| R = 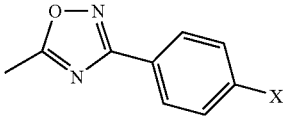 | X = —C$_8$H$_{17}$ | D-248 |
| 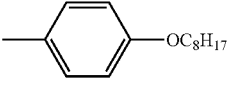 | | D-249 |
| 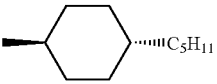 | | D-250 |

-continued
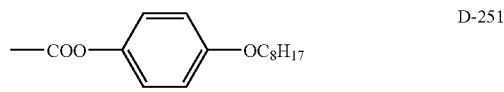
D-251
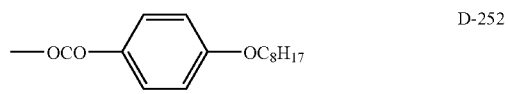
D-252
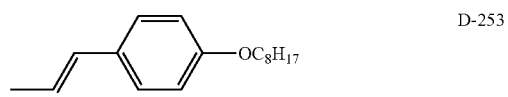
D-253
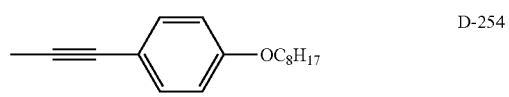
D-254
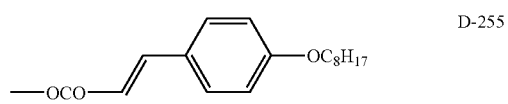
D-255
—(CH$_2$)$_2$OCOCH=CH$_2$  D-256
—COO(CH$_2$)$_4$OCOCH=CH$_2$  D-257
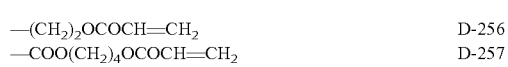
D-258
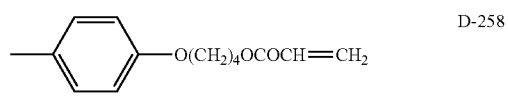
D-259
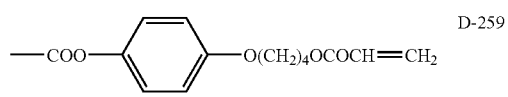
D-260
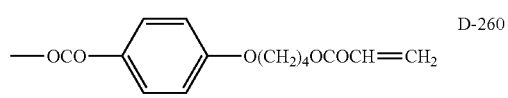
D-261
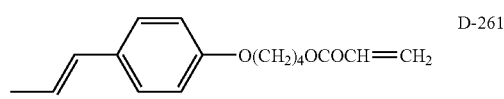
D-262
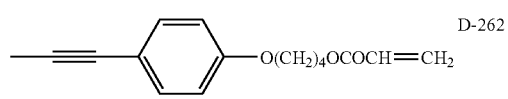
D-263
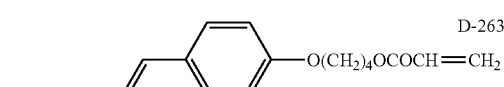
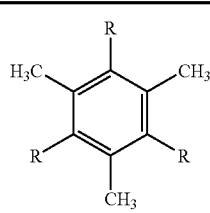    X = —O(CH$_2$)$_2$OCOCH=CH$_2$    D-264

-continued
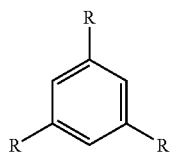
| R = | | | |
|---|---|---|---|
| R =  | —O(CH$_2$)$_3$OCOCH=CH$_2$ | | D-265 |
| R =  | —O(CH$_2$)$_4$OCOCH=CH$_2$ | | D-266 |
| R =  | —O(CH$_2$)$_4$OCOCH=CH$_2$ | | D-267 |
| R =  | —O(CH$_2$)$_3$OCOCH=CH$_2$ | | D-268 |
| R =  | —O(CH$_2$)$_4$OCOCH=CH$_2$ | | D-269 |
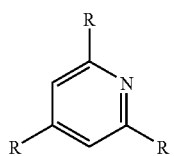
| R = 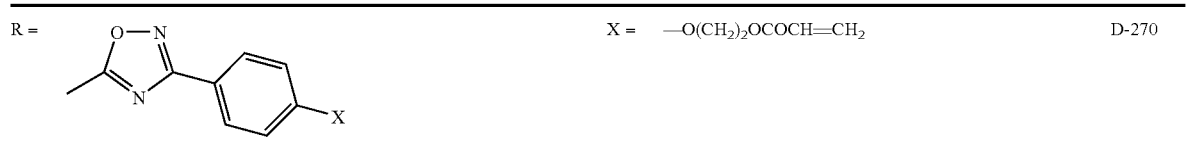 | X = | —O(CH$_2$)$_2$OCOCH=CH$_2$ | D-270 |
|---|---|---|---|
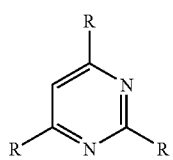
| R =  | —O(CH$_2$)$_3$OCOCH=CH$_2$ | | D-271 |
|---|---|---|---|

-continued
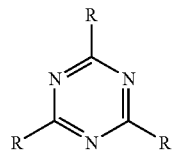
| | | |
|---|---|---|
| R =  | —O(CH$_2$)$_4$OCOCH=CH$_2$ | D-272 |
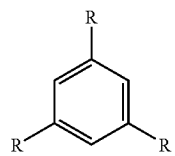
| | | |
|---|---|---|
| R =  | —O(CH$_2$)$_2$OCOCH=CH$_2$ | D-273 |
| R =  | —O(CH$_2$)$_3$OCOCH=CH$_2$ | D-274 |
| R =  | —O(CH$_2$)$_4$OCOCH=CH$_2$ | D-275 |
| R = 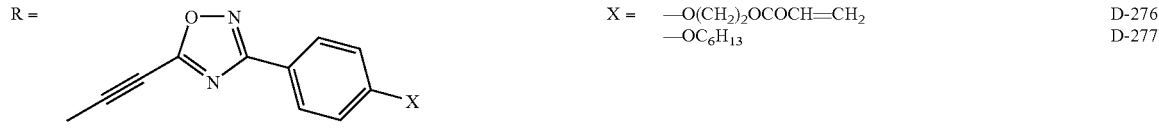 | X = —O(CH$_2$)$_2$OCOCH=CH$_2$<br>—OC$_6$H$_{13}$ | D-276<br>D-277 |
| 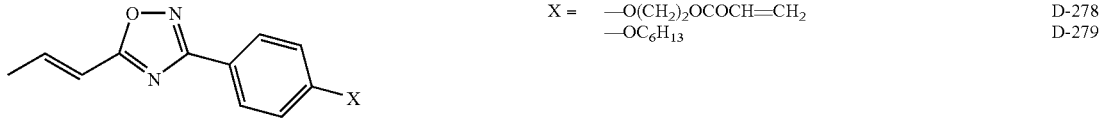 | X = —O(CH$_2$)$_2$OCOCH=CH$_2$<br>—OC$_6$H$_{13}$ | D-278<br>D-279 |
| 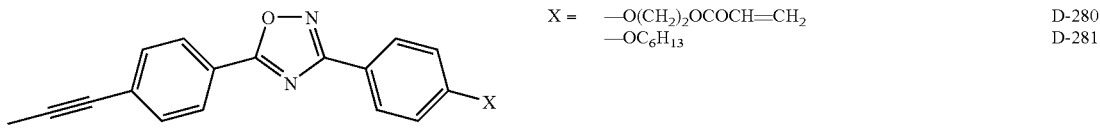 | X = —O(CH$_2$)$_2$OCOCH=CH$_2$<br>—OC$_6$H$_{13}$ | D-280<br>D-281 |
| 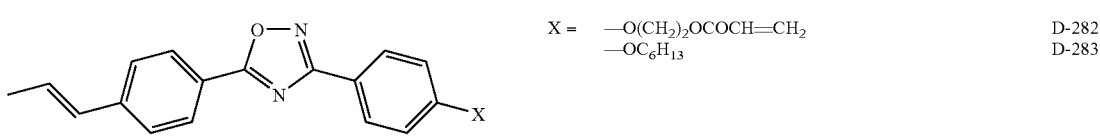 | X = —O(CH$_2$)$_2$OCOCH=CH$_2$<br>—OC$_6$H$_{13}$ | D-282<br>D-283 |
| 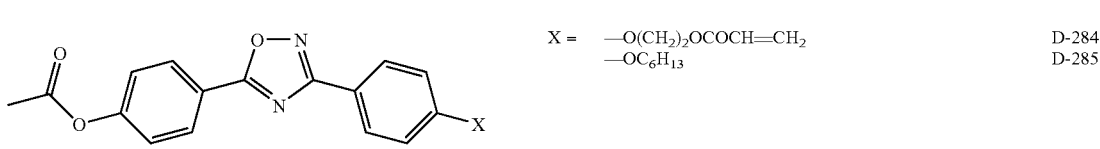 | X = —O(CH$_2$)$_2$OCOCH=CH$_2$<br>—OC$_6$H$_{13}$ | D-284<br>D-285 |

-continued
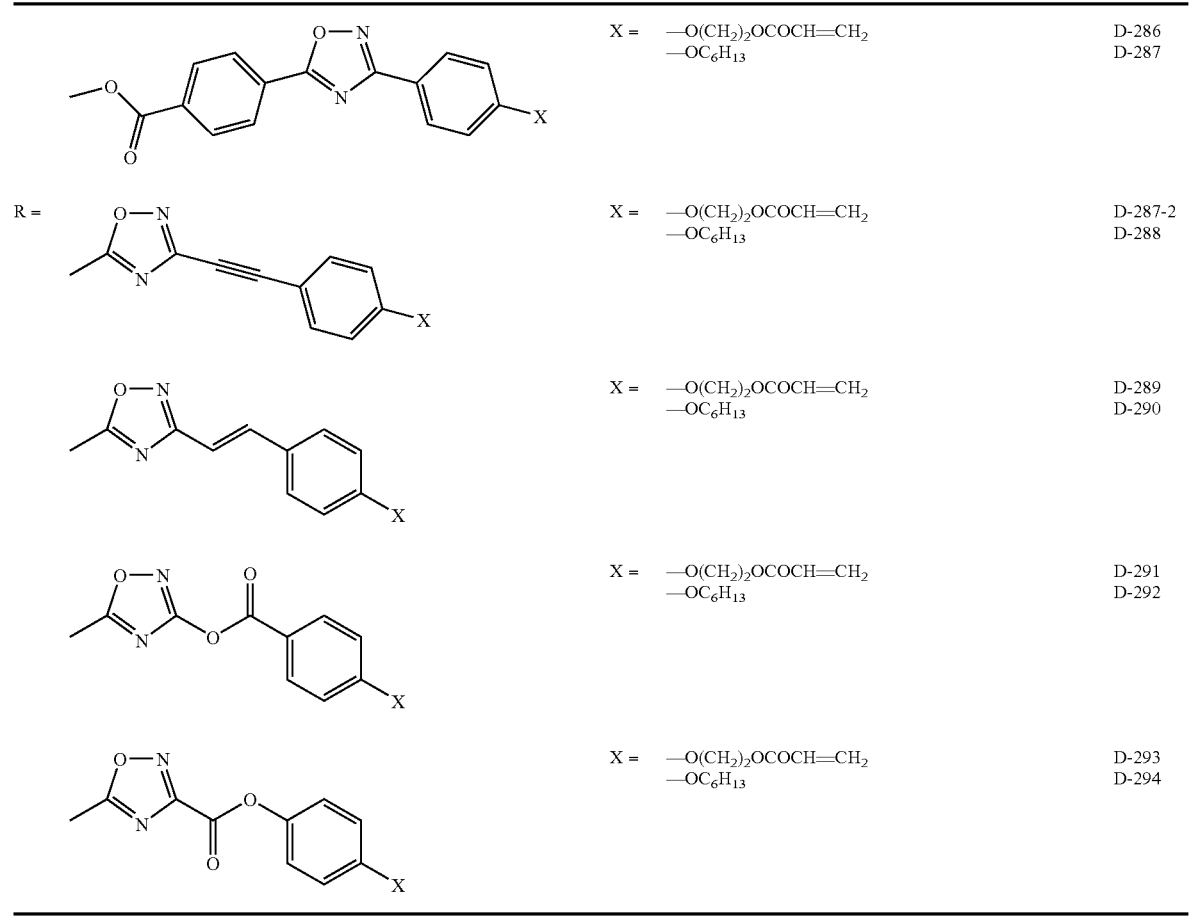
| | | |
|---|---|---|
| | X = —O(CH$_2$)$_2$OCOCH=CH$_2$ | D-286 |
| | —OC$_6$H$_{13}$ | D-287 |
| | X = —O(CH$_2$)$_2$OCOCH=CH$_2$ | D-287-2 |
| | —OC$_6$H$_{13}$ | D-288 |
| | X = —O(CH$_2$)$_2$OCOCH=CH$_2$ | D-289 |
| | —OC$_6$H$_{13}$ | D-290 |
| | X = —O(CH$_2$)$_2$OCOCH=CH$_2$ | D-291 |
| | —OC$_6$H$_{13}$ | D-292 |
| | X = —O(CH$_2$)$_2$OCOCH=CH$_2$ | D-293 |
| | —OC$_6$H$_{13}$ | D-294 |
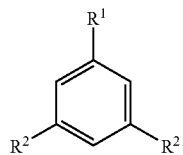
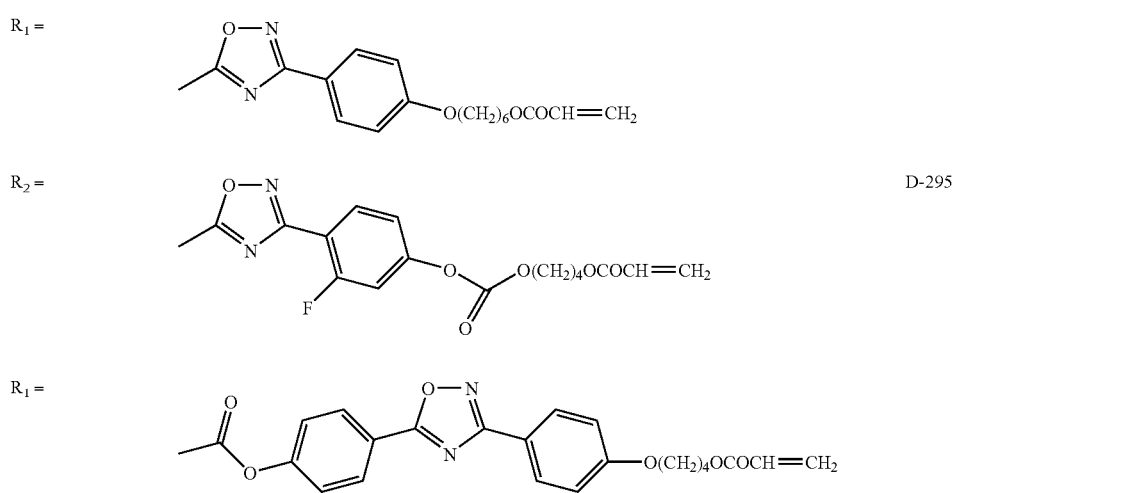
D-295

-continued
| | | |
|---|---|---|
| R₂ = 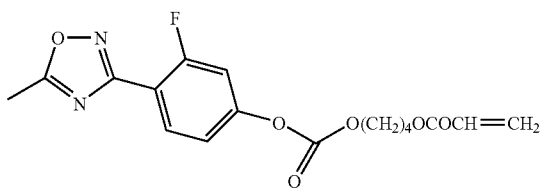 | | D-296 |
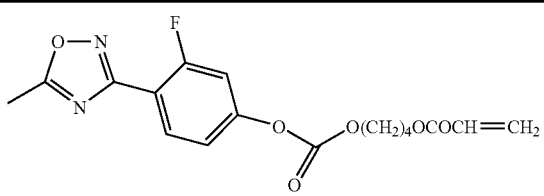
| | | |
|---|---|---|
| R₁ = 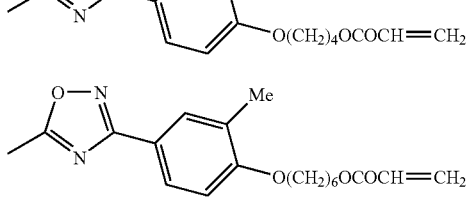 | | |
| R₂ = | | D-297 |
| R₃ = | | |
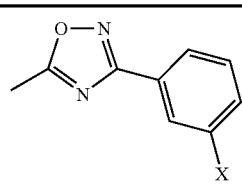
| R = | X = —OC₄H₉ | D-298 |
|---|---|---|
| | —OC₅H₁₁ | D-299 |
| | —OC₆H₁₃ | D-300 |
| | —OC₇H₁₅ | D-301 |
| | —OC₈H₁₇ | D-302 |
| | —OCH₂CH(CH₃)C₄H₉ | D-303 |
| | —O(CH₂)₂OCOCH=CH₂ | D-304 |
| | —O(CH₂)₃OCOCH=CH₂ | D-305 |
| | —O(CH₂)₄OCOCH=CH₂ | D-306 |
| | —O(CH₂)₅OCOCH=CH₂ | D-307 |
| | —O(CH₂)₆OCOCH=CH₂ | D-308 |
| | —O(CH₂)₇OCOCH=CH₂ | D-309 |
| | —O(CH₂)₈OCOCH=CH₂ | D-310 |
| | —O(CH₂)₂CH(CH₃)OCOCH=CH₂ | D-311 |
| | —O(CH₂)₃CH(CH₃)OCOCH=CH₂ | D-312 |
| | —O(CH₂CH₂O)₂)COCH=CH₂ | D-313 |
| | —O(CH₂)₄OCOC(CH₃)=CH₂ | D-314 |
| | —O(CH₂)₄OCOCH=CHCH₃ | D-315 |

-continued

| | | |
|---|---|---|
| | —O(CH$_2$)$_4$OCH=CH$_2$ | D-316 |
| | —O(CH$_2$)$_4$—CH—CH$_2$ \ / O | D-317 |
| | —OCOC$_4$H$_9$ | D-318 |
| | —OCOC$_5$H$_{11}$ | D-319 |
| | —OCOC$_6$H$_{13}$ | D-320 |
| | —OCO(CH$_2$)$_2$OCOCH=CH$_2$ | D-321 |
| | —OCO(CH$_2$)$_3$OCOCH=CH$_2$ | D-322 |
| | —OCO(CH$_2$)$_4$OCOCH=CH$_2$ | D-323 |
| | —OCO(CH$_2$)$_5$OCOCH=CH$_2$ | D-324 |
| | —OCO(CH$_2$)$_6$OCOCH=CH$_2$ | D-325 |
| | —OCO(CH$_2$)$_7$OCOCH=CH$_2$ | D-326 |
| | —OCO(CH$_2$)$_2$CH(CH$_3$)OCOCH=CH$_2$ | D-327 |
| | —OCO(CH$_2$)$_2$OCOC=CH$_2$ \| CH$_3$ | D-328 |
| | —OCO(CH$_2$)$_2$OCOCH=CHCH$_3$ | D-329 |
| | —OCO(CH$_2$)$_4$OCH=CH$_2$ | D-330 |
| | —OCO(CH$_2$)$_4$—CH—CH$_2$ \ / O | D-331 |
| | —OCOOC$_4$H$_9$ | D-332 |
| | —OCOOC$_5$H$_{11}$ | D-333 |
| | —OCOOC$_6$H$_{13}$ | D-334 |
| | —OCOO(CH$_2$)$_2$OCOCH=CH$_2$ | D-335 |
| | —OCOO(CH$_2$)$_3$OCOCH=CH$_2$ | D-336 |
| | —OCOO(CH$_2$)$_4$OCOCH=CH$_2$ | D-337 |
| | —OCOO(CH$_2$)$_5$OCOCH=CH$_2$ | D-338 |
| | —OCOO(CH$_2$)$_6$OCOCH=CH$_2$ | D-339 |
| | —OCOO(CH$_2$)$_7$OCOCH=CH$_2$ | D-340 |
| | —OCOOCH(CH$_3$)CH$_2$CH$_2$OCOCH=CH$_2$ | D-341 |
| | —OCOOCH(CH$_2$CH$_2$O)$_2$COCH=CH$_2$ | D-342 |
| | —OCOO(CH$_2$)$_2$OCOC=CH$_2$ \| CH$_3$ | D-343 |
| | —OCOO(CH$_2$)$_2$OCOCH=CHCH$_3$ | D-344 |
| | —OCOO(CH$_2$)$_4$OCH=CH$_2$ | D-345 |
| | —OCOO(CH$_2$)$_4$—CH—CH$_2$ \ / O | D-346 |

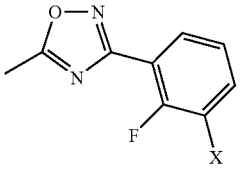

| | | |
|---|---|---|
| R = [oxadiazole-phenyl structure with F and X] | X = —OC$_6$H$_{13}$ | D-347 |
| | —OCOC$_5$H$_{11}$ | D-348 |
| | —OCOOC$_4$H$_9$ | D-349 |
| | —O(CH$_2$)$_4$OCOCH=CH$_2$ | D-350 |
| | —O(CH$_2$)$_6$OCOCH=CH$_2$ | D-351 |
| | —OCO(CH$_2$)$_3$OCOCH=CH$_2$ | D-352 |
| | —OCO(CH$_2$)$_4$OCOCH=CH$_2$ | D-353 |
| | —OCOO(CH$_2$)$_2$OCOCH=CH$_2$ | D-354 |
| | —OCOO(CH$_2$)$_4$OCOCH=CH$_2$ | D-355 |
| | —O(CH$_2$)$_2$OCOC=CH$_2$ \| CH$_3$ | D-356 |
| | —O(CH$_2$)$_2$OCOCH=CHCH$_3$ | D-357 |

-continued

| | | |
|---|---|---|
| | —O(CH₂)₄OCH=CH₂ | D-358 |
| | —O(CH₂)₄—CH—CH₂ (epoxide) | D-359 |

R = 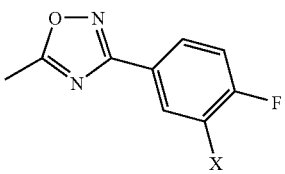   X = —OC₆H₁₃   D-360

| | |
|---|---|
| —OCOC₅H₁₁ | D-361 |
| —OCOOC₄H₉ | D-362 |
| —O(CH₂)₄OCOCH=CH₂ | D-363 |
| —O(CH₂)₆OCOCH=CH₂ | D-364 |
| —OCO(CH₂)₃OCOCH=CH₂ | D-365 |
| —OCO(CH₂)₄OCOCH=CH₂ | D-366 |
| —OCOO(CH₂)₂OCOCH=CH₂ | D-367 |
| —OCOO(CH₂)₄OCOCH=CH₂ | D-368 |
| —O(CH₂)₂OCOC(CH₃)=CH₂ | D-369 |
| —O(CH₂)₂OCOCH=CHCH₃ | D-370 |
| —O(CH₂)₄OCH=CH₂ | D-371 |
| —O(CH₂)₄—CH—CH₂ (epoxide) | D-372 |

R = 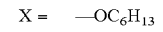   X = —OC₆H₁₃   D-373

| | |
|---|---|
| —OCOC₅H₁₁ | D-374 |
| —OCOOC₄H₉ | D-375 |
| —O(CH₂)₄OCOCH=CH₂ | D-376 |
| —O(CH₂)₆OCOCH=CH₂ | D-377 |
| —OCO(CH₂)₃OCOCH=CH₂ | D-378 |
| —OCO(CH₂)₄OCOCH=CH₂ | D-379 |
| —OCOO(CH₂)₂OCOCH=CH₂ | D-380 |
| —OCOO(CH₂)₄OCOCH=CH₂ | D-381 |
| —O(CH₂)₂OCOC(CH₃)=CH₂ | D-382 |
| —O(CH₂)₂OCOCH=CHCH₃ | D-383 |
| —O(CH₂)₄OCH=CH₂ | D-384 |
| —O(CH₂)₄—CH—CH₂ (epoxide) | D-385 |

R = 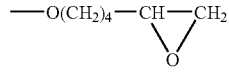   X = —OC₆H₁₃   D-386

| | |
|---|---|
| —OCOC₅H₁₁ | D-387 |
| —OCOOC₄H₉ | D-388 |
| —O(CH₂)₄OCOCH=CH₂ | D-389 |
| —O(CH₂)₆OCOCH=CH₂ | D-390 |

-continued

| | | |
|---|---|---|
| | —OCO(CH₂)₃OCOCH=CH₂ | D-391 |
| | —OCO(CH₂)₄OCOCH=CH₂ | D-392 |
| | —OCOO(CH₂)₂OCOCH=CH₂ | D-393 |
| | —OCOO(CH₂)₄OCOCH=CH₂ | D-394 |
| | —O(CH₂)₂OCOC(CH₃)=CH₂ | D-395 |
| | —O(CH₂)₂OCOCH=CHCH₃ | D-396 |
| | —O(CH₂)₄OCH=CH₂ | D-397 |
| | —O(CH₂)₄—CH(—O—)CH₂ (epoxide) | D-398 |

R = 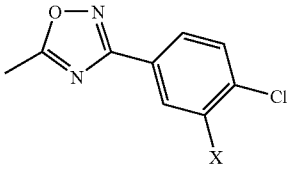   X = —OC₆H₁₃   D-399

| | | |
|---|---|---|
| | —OCOC₅H₁₁ | D-400 |
| | —OCOOC₄H₉ | D-401 |
| | —O(CH₂)₄OCOCH=CH₂ | D-402 |
| | —O(CH₂)₆OCOCH=CH₂ | D-403 |
| | —OCO(CH₂)₃OCOCH=CH₂ | D-404 |
| | —OCO(CH₂)₄OCOCH=CH₂ | D-405 |
| | —OCOO(CH₂)₂OCOCH=CH₂ | D-406 |
| | —OCOO(CH₂)₄OCOCH=CH₂ | D-407 |
| | —O(CH₂)₂OCOC(CH₃)=CH₂ | D-408 |
| | —O(CH₂)₂OCOCH=CHCH₃ | D-409 |
| | —O(CH₂)₄OCH=CH₂ | D-410 |
| | —O(CH₂)₄—CH(—O—)CH₂ (epoxide) | D-411 |

R = 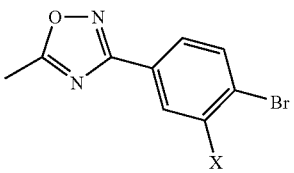   X = —OC₆H₁₃   D-412

| | | |
|---|---|---|
| | —OCOC₅H₁₁ | D-413 |
| | —OCOOC₄H₉ | D-414 |
| | —O(CH₂)₄OCOCH=CH₂ | D-415 |
| | —O(CH₂)₆OCOCH=CH₂ | D-416 |
| | —OCO(CH₂)₃OCOCH=CH₂ | D-417 |
| | —OCO(CH₂)₄OCOCH=CH₂ | D-418 |
| | —OCOO(CH₂)₂OCOCH=CH₂ | D-419 |
| | —OCOO(CH₂)₄OCOCH=CH₂ | D-420 |
| | —O(CH₂)₂OCOC(CH₃)=CH₂ | D-421 |
| | —O(CH₂)₂OCOCH=CHCH₃ | D-422 |
| | —O(CH₂)₄OCH=CH₂ | D-423 |
| | —O(CH₂)₄—CH(—O—)CH₂ (epoxide) | D-424 |

-continued

| R = 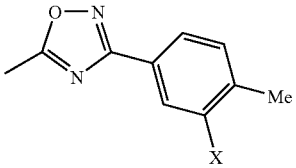 | X = —OC$_6$H$_{13}$ | D-425 |
|---|---|---|
| | —OCOC$_5$H$_{11}$ | D-426 |
| | —OCOOC$_4$H$_9$ | D-427 |
| | —O(CH$_2$)$_4$OCOCH=CH$_2$ | D-428 |
| | —O(CH$_2$)$_6$OCOCH=CH$_2$ | D-429 |
| | —OCO(CH$_2$)$_3$OCOCH=CH$_2$ | D-430 |
| | —OCO(CH$_2$)$_4$OCOCH=CH$_2$ | D-431 |
| | —OCOO(CH$_2$)$_2$OCOCH=CH$_2$ | D-432 |
| | —OCOO(CH$_4$)$_4$OCOCH=CH$_2$ | D-433 |
| | —O(CH$_2$)$_2$OCOC(CH$_3$)=CH$_2$ | D-434 |
| | —O(CH$_2$)$_2$OCOCH=CHCH$_3$ | D-435 |
| | —O(CH$_2$)$_4$OCH=CH$_2$ | D-436 |
| | —O(CH$_2$)$_4$—CH—CH$_2$ (epoxide) | D-437 |
| R =  | X = —OC$_6$H$_{13}$ | D-438 |
| | —OCOC$_5$H$_{11}$ | D-439 |
| | —OCOOC$_4$H$_9$ | D-440 |
| | —O(CH$_2$)$_4$OCOCH=CH$_2$ | D-441 |
| | —O(CH$_2$)$_6$OCOCH=CH$_2$ | D-442 |
| | —OCO(CH$_2$)$_3$OCOCH=CH$_2$ | D-443 |
| | —OCO(CH$_2$)$_4$OCOCH=CH$_2$ | D-444 |
| | —OCOO(CH$_2$)$_2$OCOCH=CH$_2$ | D-445 |
| | —OCOO(CH$_2$)$_4$OCOCH=CH$_2$ | D-446 |
| | —O(CH$_2$)$_2$OCOC(CH$_3$)=CH$_2$ | D-447 |
| | —O(CH$_2$)$_2$OCOCH=CHCH$_3$ | D-448 |
| | —O(CH$_2$)$_4$OCH=CH$_2$ | D-449 |
| | —O(CH$_2$)$_4$—CH—CH$_2$ (epoxide) | D-450 |
| R = 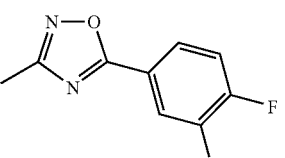 | X = —OC$_6$H$_{13}$ | D-451 |
| | —OCOC$_5$H$_{11}$ | D-452 |
| | —OCOOC$_4$H$_9$ | D-453 |
| | —O(CH$_2$)$_4$OCOCH=CH$_2$ | D-454 |
| | —O(CH$_2$)$_6$OCOCH=CH$_2$ | D-455 |
| | —OCO(CH$_2$)$_3$OCOCH=CH$_2$ | D-456 |
| | —OCO(CH$_2$)$_4$OCOCH=CH$_2$ | D-457 |
| | —OCOO(CH$_2$)$_2$OCOCH=CH$_2$ | D-458 |
| | —OCOO(CH$_2$)$_4$OCOCH=CH$_2$ | D-459 |

-continued
| | | |
|---|---|---|
| | —O(CH$_2$)$_2$OCOC(CH$_3$)=CH$_2$ | D-460 |
| | —O(CH$_2$)$_2$OCOCH=CHCH$_3$ | D-461 |
| | —O(CH$_2$)$_4$OCH=CH$_2$ | D-462 |
| | —O(CH$_2$)$_4$—CH—CH$_2$ (epoxide) | D-463 |
R = 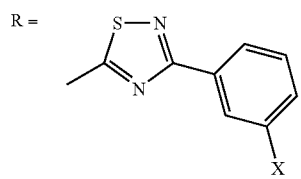    X = —O(CH$_2$)$_4$OCOCH=CH$_2$    D-464
R = 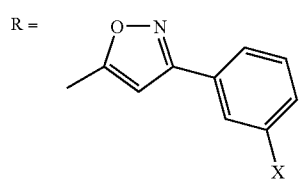    X = —O(CH$_2$)$_4$OCOCH=CH$_2$    D-465
R = 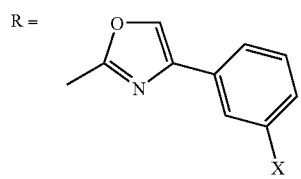    X = —O(CH$_2$)$_4$OCOCH=CH$_2$    D-466
R = 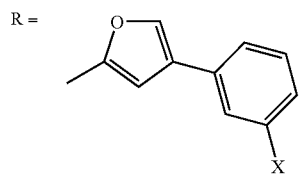    X = —O(CH$_2$)$_4$OCOCH=CH$_2$    D-467
R = 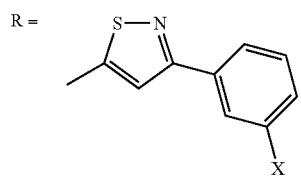    X = —O(CH$_2$)$_4$OCOCH=CH$_2$    D-468
R = 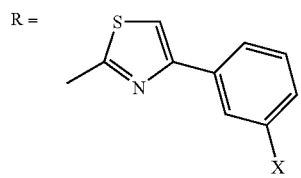    X = —O(CH$_2$)$_4$OCOCH=CH$_2$    D-469
R = 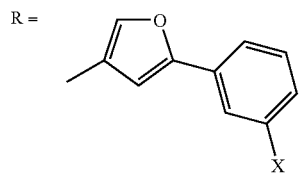    X = —O(CH$_2$)$_4$OCOCH=CH$_2$    D-470

-continued
| | | | |
|---|---|---|---|
| R = 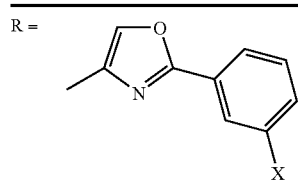 | X = 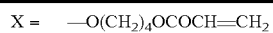 —O(CH$_2$)$_4$OCOCH=CH$_2$ | | D-471 |
| R = 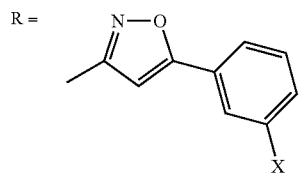 | X = 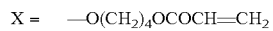 —O(CH$_2$)$_4$OCOCH=CH$_2$ | | D-472 |
| R = 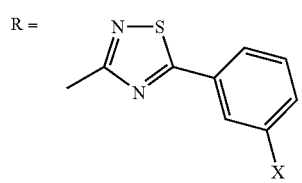 | X = 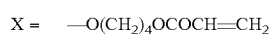 —O(CH$_2$)$_4$OCOCH=CH$_2$ | | D-473 |
| R = 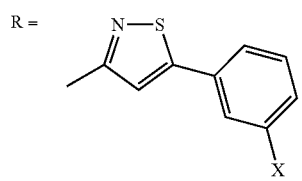 | X = 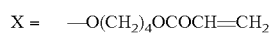 —O(CH$_2$)$_4$OCOCH=CH$_2$ | | D-474 |
| R = 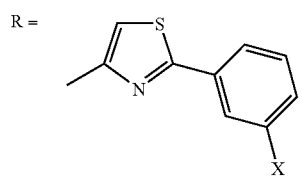 | X = 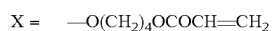 —O(CH$_2$)$_4$OCOCH=CH$_2$ | | D-475 |
| R = 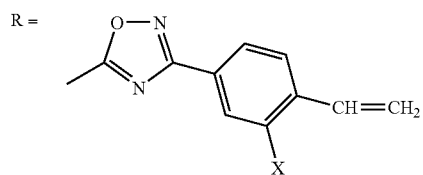 | X = 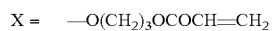 —O(CH$_2$)$_3$OCOCH=CH$_2$ | | D-476 |
| R = 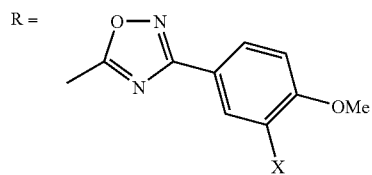 | X = 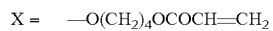 —O(CH$_2$)$_4$OCOCH=CH$_2$ | | D-477 |
| R = 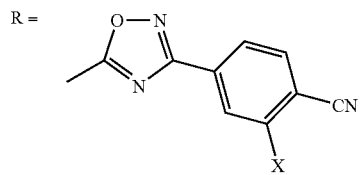 | X = 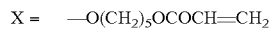 —O(CH$_2$)$_5$OCOCH=CH$_2$ | | D-478 |
| R = 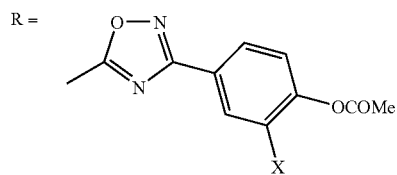 | X = 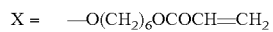 —O(CH$_2$)$_6$OCOCH=CH$_2$ | | D-479 |

-continued

| | | |
|---|---|---|
| R = [5-methyl-1,2,4-oxadiazol-3-yl on benzene with COOMe] | X = —O(CH$_2$)$_5$OCOCH=CH$_2$ | D-480 |

[Structure: 2,4,6-trisubstituted pyridine with R groups]

| | | |
|---|---|---|
| R = [5-methyl-1,2,4-oxadiazol-3-yl-phenyl-X] | X = —O(CH$_2$)$_4$OCOCH=CH$_2$ | D-481 |

[Structure: 2,4,6-trisubstituted pyrimidine with R groups]

| | | |
|---|---|---|
| R = [5-methyl-1,2,4-oxadiazol-3-yl-phenyl-X] | X = —O(CH$_2$)$_3$OCOCH=CH$_2$ | D-482 |

[Structure: 2,4,6-trisubstituted 1,3,5-triazine with R groups]

| | | |
|---|---|---|
| R = [5-methyl-1,2,4-oxadiazol-3-yl-pyridine-X] | X = —O(CH$_2$)$_3$OCOCH=CH$_2$ | D-484 |
| R = [5-methyl-1,3,4-oxadiazol-2-yl-phenyl-X] | X = —OC$_6$H$_{13}$ | D-485 |
| | —OCOC$_5$H$_{11}$ | D-486 |
| | —OCOOC$_4$H$_9$ | D-487 |
| | —O(CH$_2$)$_4$OCOCH=CH$_2$ | D-488 |
| | —O(CH$_2$)$_6$OCOCH=CH$_2$ | D-489 |
| | —OCO(CH$_2$)$_3$OCOCH=CH$_2$ | D-490 |
| | —OCO(CH$_2$)$_4$OCOCH=CH$_2$ | D-491 |
| | —OCOO(CH$_2$)$_2$OCOCH=CH$_2$ | D-492 |
| | —OCOO(CH$_2$)$_4$OCOCH=CH$_2$ | D-493 |

-continued

| R = | | X = | | |
|---|---|---|---|---|
| | | —O(CH₂)₂OCOC(CH₃)=CH₂ | | D-494 |
| | | —O(CH₂)₂OCOCH=CHCH₃ | | D-495 |
| | | —O(CH₂)₄OCH=CH₂ | | D-496 |
| | | —O(CH₂)₄—CH—CH₂ (epoxide) | | D-497 |

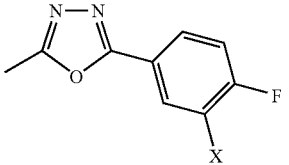

| | X = —OC₆H₁₃ | D-498 |
|---|---|---|

| | —OCOC₅H₁₁ | D-499 |
|---|---|---|
| | —OCOOC₄H₉ | D-500 |
| | —O(CH₂)₄OCOCH=CH₂ | D-501 |
| | —O(CH₂)₆OCOCH=CH₂ | D-502 |
| | —OCO(CH₂)₃OCOCH=CH₂ | D-503 |
| | —OCO(CH₂)₄OCOCH=CH₂ | D-504 |
| | —OCOO(CH₂)₂OCOCH=CH₂ | D-505 |
| | —OCOO(CH₂)₄OCOCH=CH₂ | D-506 |
| | —O(CH₂)₂OCOC(CH₃)=CH₂ | D-507 |
| | —O(CH₂)₂OCOCH=CHCH₃ | D-508 |
| | —O(CH₂)₄OCH=CH₂ | D-509 |
| | —O(CH₂)₄—CH—CH₂ (epoxide) | D-510 |

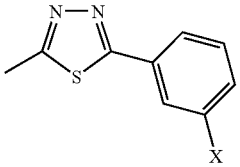

X = —O(CH₂)₄OCOCH=CH₂   D-511

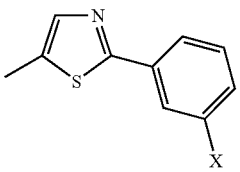

X = —O(CH₂)₄OCOCH=CH₂   D-512

X = —O(CH₂)₄OCOCH=CH₂   D-513

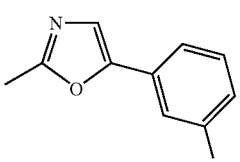

X = —O(CH₂)₄OCOCH=CH₂   D-514

-continued

| R = | X = | |
|---|---|---|
| 5-methyl-2-(3-X-phenyl)oxazole | —O(CH$_2$)$_4$OCOCH=CH$_2$ | D-515 |
| 5-methyl-2-(3-X-phenyl)isoxazole | —O(CH$_2$)$_4$OCOCH=CH$_2$ | D-516 |
| 5-methyl-2-(3-X-phenyl)thiophene | —O(CH$_2$)$_4$OCOCH=CH$_2$ | D-517 |
| 5-methyl-3-(3-X-phenyl)-1,2,4-oxadiazole | —COOC$_4$H$_9$ | D-518 |

| | |
|---|---|
| —COOC$_5$H$_{11}$ | D-519 |
| —COOC$_6$H$_{13}$ | D-520 |
| —COO(CH$_2$)$_2$OCOCH=CH$_2$ | D-521 |
| —COO(CH$_2$)$_3$OCOCH=CH$_2$ | D-522 |
| —COO(CH$_2$)$_4$OCOCH=CH$_2$ | D-523 |
| —COO(CH$_2$)$_5$OCOCH=CH$_2$ | D-524 |
| —COO(CH$_2$)$_6$OCOCH=CH$_2$ | D-525 |
| —COO(CH$_2$)$_7$OCOCH=CH$_2$ | D-526 |
| —COO(CH$_2$)$_8$OCOCH=CH$_2$ | D-527 |
| —COO(CH$_2$CH$_2$O)$_2$COCH=CH$_2$ | D-528 |
| —COO(CH$_2$)$_2$CH(CH$_3$)OCOCH=CH$_2$ | D-529 |
| —COO(CH$_2$)$_3$CH(CH$_3$)OCOCH=CH$_2$ | D-530 |
| —COO(CH$_2$)$_4$CH(CH$_3$)OCOCH=CH$_2$ | D-531 |
| —COOCH$_2$CH(CH$_3$)CH$_2$OCOCH=CH$_2$ | D-532 |
| —COO(CH$_2$)$_2$CH(CH$_3$(CH$_2$)$_2$OCOCH=CH$_2$ | D-533 |
| —COOCH(CH$_3$)(CH$_2$)$_2$OCOCH=CH$_2$ | D-534 |
| —COO(CH$_2$)$_5$OCOC(CH$_3$)=CH$_2$ | D-535 |
| —COO(CH$_2$)$_4$OCH=CH$_2$ | D-536 |
| —COO(CH$_2$)$_4$—CH—CH$_2$ (epoxide) | D-537 |

| R = | X = | |
|---|---|---|
| 3-methyl-5-(3-X-phenyl)-1,2,4-oxadiazole | —COOC$_4$H$_9$ | D-538 |

| | |
|---|---|
| —COOC$_5$H$_{11}$ | D-539 |
| —COOC$_6$H$_{13}$ | D-540 |
| —COO(CH$_2$)$_2$OCOCH=CH$_2$ | D-541 |
| —COO(CH$_2$)$_3$OCOCH=CH$_2$ | D-542 |
| —COO(CH$_2$)$_4$OCOCH=CH$_2$ | D-543 |
| —COO(CH$_2$)$_5$OCOCH=CH$_2$ | D-544 |
| —COO(CH$_2$)$_6$OCOCH=CH$_2$ | D-545 |

-continued

| | |
|---|---|
| —COO(CH$_2$)$_7$OCOCH=CH$_2$ | D-546 |
| —COO(CH$_2$)$_8$OCOCH=CH$_2$ | D-547 |
| —COO(CH$_2$CH$_2$O)$_2$COCH=CH$_2$ | D-548 |
| —COO(CH$_2$)$_2$CH(CH$_3$)OCOCH=CH$_2$ | D-549 |
| —COO(CH$_2$)$_3$CH(CH$_3$)OCOCH=CH$_2$ | D-550 |
| —COO(CH$_2$)$_4$CH(CH$_3$)OCOCH=CH$_2$ | D-551 |
| —COOCH$_2$CH(CH$_3$)CH$_2$OCOCH=CH$_2$ | D-552 |
| —COO(CH$_2$)$_2$CH(CH$_3$)(CH$_2$)$_2$OCOCH=CH$_2$ | D-553 |
| —COOCH(CH$_3$)(CH$_2$)$_2$OCOCH=CH$_2$ | D-554 |
| —COO(CH$_2$)$_5$OCOC(CH$_3$)=CH$_2$ | D-555 |
| —COO(CH$_2$)$_4$OCH=CH$_2$ | D-556 |
| —COO(CH$_2$)$_4$—CH—CH$_2$ (epoxide) | D-557 |

R = 5-methyl-1,3,4-oxadiazol-2-yl attached to meta-substituted phenyl bearing X

X =  —COOC$_4$H$_9$   D-558

| | |
|---|---|
| —COOC$_5$H$_{11}$ | D-559 |
| —COOC$_6$H$_{13}$ | D-560 |
| —COO(CH$_2$)$_2$OCOCH=CH$_2$ | D-561 |
| —COO(CH$_2$)$_3$OCOCH=CH$_2$ | D-562 |
| —COO(CH$_2$)$_4$OCOCH=CH$_2$ | D-563 |
| —COO(CH$_2$)$_5$OCOCH=CH$_2$ | D-564 |
| —COO(CH$_2$)$_6$OCOCH=CH$_2$ | D-565 |
| —COO(CH$_2$)$_7$OCOCH=CH$_2$ | D-566 |
| —COO(CH$_2$)$_8$OCOCH=CH$_2$ | D-567 |
| —COO(CH$_2$CH$_2$O)$_2$COCH=CH$_2$ | D-568 |
| —COO(CH$_2$)$_2$CH(CH$_3$)OCOCH=CH$_2$ | D-569 |
| —COO(CH$_2$)$_3$CH(CH$_3$)OCOCH=CH$_2$ | D-570 |
| —COO(CH$_2$)$_4$CH(CH$_3$)OCOCH=CH$_2$ | D-571 |
| —COOCH$_2$CH(CH$_3$)CH$_2$OCOCH=CH$_2$ | D-572 |
| —COO(CH$_2$)$_2$CH(CH$_3$(CH$_2$)$_2$OCOCH=CH$_2$ | D-573 |
| —COOCH(CH$_3$)(CH$_2$)$_2$OCOCH=CH$_2$ | D-574 |
| —COO(CH$_2$)$_5$OCOC(CH$_3$)=CH$_2$ | D-575 |
| —COO(CH$_4$)$_4$OCH=CH$_2$ | D-576 |
| —COO(CH$_2$)$_4$—CH—CH$_2$ (epoxide) | D-577 |

The liquid crystalline compound for use in the invention desirably generates a liquid crystal phase showing good monodomain property. By making the monodomain property good, such problems can be effectively prevented that an obtained structure becomes of polydomain to generate alignment defect on the boundary between domains, thereby generating light scattering. Further, when a good monodomain property is shown, a retardation plate has a higher light transmittance, which is preferable.

As liquid crystal phases that are generated by the liquid crystalline compound for use in the invention, a columnar phase and a discotic nematic phase (ND phase) can be mentioned. Among these liquid crystal phases, a discotic nematic phase (ND phase) that shows a good monodomain property and is capable of hybrid alignment is most preferable.

A liquid crystalline compound having a less anisotropic chromatic dispersion is better as one for use in the invention. Specifically it satisfies the following formula (1):

$$Re(450)/Re(650)<1.25 \quad \text{formula (1):}$$

wherein Re(450) and Re(650) are in-plane retardation values (unit: nm) of the optically anisotropic layer (1) at wavelengths of 450 nm and 650 nm, respectively.

Re(450)/Re(650) is more preferably 1.20 or less, and further preferably 1.15 or less.

In hybrid alignment, an angle between a physical symmetric axis of the liquid crystalline compound of the invention and the face of the optically anisotropic layer (2), that is, a tilt angle increases or decreases in the depth direction (perpendicular to the optically anisotropic layer (2)) of the optically anisotropic layer and along with the increase in the distance from the face of a polarizing film. The angle preferably decreases along with increase in the distance. In addition, as alteration of the tilt angle, continuous increase, continuous decrease, intermittent increase, intermittent decrease, alteration including continuous increase and continuous decrease, or intermittent alteration including increase and decrease is possible. The intermittent alteration includes an region in which the tilt angle does not alter along the way in the thickness direction. When a region in which the angle does not alter is included, increase or decrease as a whole is sufficient. However, the tilt angle preferably alters continuously.

In general, an average direction of a physical symmetric axis of a discotic liquid crystalline compound can be adjusted by selecting a material of the discotic liquid crystalline compound or an alignment film, or selecting a rubbing treatment method. Further, a physical symmetric axis direction of a discotic liquid crystalline compound on the front face side (air side) can be generally adjusted by selecting a discotic liquid crystalline compound or the type of an additive used with a discotic liquid crystalline compound.

Examples of the additive used with a discotic liquid crystalline compound include plasticizer, surfactant, polymerizable monomer, polymer and a low molecular weight compound. The degree of alteration in an alignment direction of the long axis can be also adjusted by selecting a liquid crystalline compound and an additive in the same way as described above.

As a plasticizer and a polymerizable monomer to be used with the liquid crystalline compound of the invention, such ones are adopted that have compatibility with the liquid crystalline compound of the invention, can give alteration to the tilt angle of the discotic liquid crystalline compound or do not disturb the alignment thereof.

The liquid crystalline compound for use in the invention preferably generates a liquid crystal phase within a range of 20° C.-300° C. The generation temperature is more preferably 40° C.-280° C., and further preferably 60° C.-250° C. Here, the phrase "generates a liquid crystal phase within a range of 20° C.-300° C." means also to include the case where the liquid crystal temperature range strides across 20° C. (for example, 10° C.-22° C.), or it strides across 300° C. (for example, 298° C.-310° C.). 40° C.-280° C. and 60° C.-250° C. have the same meaning.

As a surfactant, a fluorine-containing compound is preferable. Surfactants described in, for example, JP-A-2001-330725 can be adopted.

A polymer and a low molecular weight compound preferably give alteration to the tilt angle of the discotic liquid crystalline compound.

As the polymer, cellulose ester is preferable. Cellulose esters described in, for example, paragraph number 0178 of JP-A-2000-155216 can be adopted. When the relation with the alignment of the discotic liquid crystalline compound is taken into consideration, an addition amount of the polymer is preferably 0.1-10% by mass, and further preferably 0.1-8% by mass relative to the discotic liquid crystalline compound.

The optically anisotropic layer (1) can be formed by applying a coating liquid containing the discotic liquid crystalline compound and, according to need, an after-mentioned polymerization initiator or any component on an alignment film.

A solvent for use in preparing the coating liquid is preferably an organic solvent. Examples of the organic solvent include amides (for example, N,N-dimethylformamide), sulfoxides (for example, dimethylsulfoxide), heterocyclic compounds (for example, pyridine), hydrocarbons (for example, benzene, hexane), alkyl halides (for example, chloroform, dichloromethane, tetrachloroethane), esters (for example, methyl acetate, butyl acetate), ketones (for example, acetone, methyl ethyl ketone), ethers (for example, tetrahydrofuran, 1,2-dimethoxyethane). Alkyl halides and ketones are preferable. Two or more types of organic solvents may be used simultaneously.

Application of the coating liquid can be carried out by a publicly known method (for example, a wire bar coating method, an extrusion coating method, a direct gravure coating method, a reverse gravure coating method, or a die coating method).

A thinner thickness is preferably required for the optically anisotropic layer (1) because the alignment speed becomes large when the liquid crystalline compound is aligned, and also from the viewpoint of productivity. However, a certain level of thickness is required in order to generate sufficient optical anisotropy. Further, in order to generate sufficient optical anisotropy, a liquid crystalline compound to be used has preferably a larger intrinsic birefringence. However, a liquid crystalline compound having a large intrinsic birefringence leads to give a large chromatic dispersion (Re(450)/Re (650)) to generate a case where the formula (1) is not satisfied. Thus, the selection of the liquid crystalline compound for use in the optically anisotropic layer (1) is important.

As an indicator showing an intrinsic birefringence of a liquid crystalline compound, a value ($Re\_m(550)/d$) obtained by dividing a front retardation of a uniaxial alignment layer at 550 nm in which the director of the liquid crystalline compound has been aligned parallel in the plane by the thickness of a uniaxial alignment layer can be mentioned. In the invention, the following formula (2) is satisfied:

$$0.09 < Re\_m(550)/d \qquad \text{formula (2):}$$

wherein $Re\_m(550)$ is an in-plane retardation value (unit: nm) at a wavelength of 550 nm of a uniaxial alignment layer in which the director of the liquid crystalline compound constituting the optically anisotropic layer (1) has been aligned parallel in plane, and d is a thickness (unit: nm) of the uniaxial alignment layer.

The value of $Re\_m(550)/d$ is preferably 0.09 or more, more preferably 0.10 or more, and further preferably 0.11 or more.

The thickness of the optically anisotropic layer (1) is preferably 0.1-1.5 μm, more preferably 0.2-1.3 μm, and most preferably 0.3-1.0 μm.

The aligned discotic liquid crystalline compound can be fixed while maintaining the alignment state. The fixation is preferably carried out by polymerization reaction. The polymerization reaction includes a thermal polymerization reaction using a thermal polymerization initiator and a photo polymerization reaction using a photo polymerization initiator. A photo polymerization reaction is preferable.

Examples of the photo polymerization initiator include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127 and 2,951,758), a combination of triaryl imidazole dimmer and p-aminophenyl ketone (described in U.S. Pat. No. 3,549,367), acridine and phenazine compounds (described in JP-A-60-105667 and U.S. Pat. No. 4,239,850) and oxadiazole compounds (described in U.S. Pat. No. 4,212,970).

The use amount of a photo polymerization initiator is preferably within a range of 0.01-20% by mass of the solid content of a coating liquid, and more preferably within a range of 0.5-5% by mass.

As light irradiation for polymerization of a liquid crystalline compound, use of ultraviolet rays is preferable.

Irradiation energy is preferably 20 mJ/cm$^2$-50 J/cm$^2$, more preferably 20-5000 mJ/cm$^2$, and more preferably 100-800 mJ/cm$^2$. In order to accelerate a photo polymerization reaction, light irradiation may be carried out under heated conditions.

A protective layer may be provided on the optically anisotropic layer (1).

(Optically Anisotropic Layer (2))

In the invention, in addition to the optically anisotropic layer (1), an optically anisotropic layer (2) may be provided. By providing such optically anisotropic layer (2), such advantages can be obtained as function as a support for the optically anisotropic layer (1), as well as widening a control range of optical property as an optical film, and enhancing display property of a liquid crystal display device.

The optically anisotropic layer (2) in the invention is composed of at least one polymer film. Here, "composed of a polymer film" means that the layer includes not only a film consisting of polymer alone, but also films including materials other than polymer within a range of not deviating from the purpose of the invention. In other words, the phrase means to include films containing polymer as a primary component.

Specifically, the optically anisotropic layer (2) has an Rth value measured at a wavelength of 550 nm preferably within a range of 100-300 nm, and more preferably 150-200 nm. In addition, the optically anisotropic layer (2) has an Re value of preferably 30-60 nm, and more preferably 35-50 nm. The adoption of an optically anisotropic layer having such Rth value and Re value gives such advantage that the display property as a liquid crystal display device such as a view angle property is improved.

The polymer film constituting the optically anisotropic layer (2) may be 1, or 2 or more. But, the above Re value and Rth value can be realized by one polymer film. Accordingly, the optically anisotropic layer (2) is preferably composed of 1 polymer film.

The polymer to be adopted for the optically anisotropic layer (2) is preferably a cellulose-based polymer, more preferably cellulose ester, and further preferably cellulose acylate. The adoption of cellulose acylate gives such advantage that the above-mentioned control of the optical property becomes possible.

Particularly, lower fatty acid esters of cellulose are preferable. The lower fatty acid means fatty acids having 6 or less carbon atoms. Cellulose acylates having 2-4 carbon atoms are preferable, and cellulose acetate is more preferable. Mixed fatty acid esters such as cellulose acetate propionate and cellulose acetate butyrate may be used.

The viscosity-average degree of polymerization (DP) of cellulose acetate is preferably 250 or more, and more preferably 290 or more. Further, the cellulose acetate preferably has a narrow molecular weight distribution Mw/Mn (Mw: weight average molecular weight, Mn: number average molecular weight) by gel permeation chromatography. A specific Mw/Mn value is preferably 1.00-1.70, more preferably 1.30-1.65, and particularly preferably 1.40-1.60.

The degree of acetylation of the cellulose acetate is preferably 55.0-62.5%, more preferably 57.0-62.0%. The degree of acetylation means the amount of bonding acetic acid per unit mass of cellulose. The degree of acetylation can be obtained by measurement and calculation of a degree of acetylation in ASTM=D-817-91 (test method of cellulose acetate and the like).

In cellulose acetate, hydroxyls at 2-, 3- and 6-positions of cellulose are not evenly substituted, but a substitution degree at the 2-position tends to become small. For the cellulose acetate in the optically anisotropic layer (2), the substitution degree at 6-positions of cellulose is preferably around equal to or more than that at 2- and 3-positions.

The percentage of the substitution degree at 6-positions relative to the sum of substitution degrees at 2-, 3- and 6-positions is preferably 30-40%, more preferably 31-40%, further preferably 32-40%. The substitution degree at 6-positions is preferably 0.88 or more.

Cellulose acylate and a method for synthesizing the same described in KOKAI-GIHO (Disclosure of Techniques) (Kogi No. 2001-1745, p 9, published on Mar. 15, 2001 by Japan Institute of Invention and Innovation) can be adopted.

In order to adjust retardation of cellulose acetate, a method of giving an external force such as stretching can be mentioned as an example. A retardation increasing agent may be added to adjust an optical anisotropy. As the retardation increasing agent, an aromatic compound having at least 2 aromatic rings is preferable. The aromatic compound is preferably used within a range of 0.01-20 parts by mass relative to 100 parts by mass of the polymer. Two or more types of aromatic compounds may be used simultaneously. The aromatic ring of the aromatic compound includes aromatic hetero rings in addition to aromatic hydrocarbon rings.

Retardation increasing agents described in EP 0911656 A, JP-A-2000-111914 and JP-A-2000-275434 can be preferably adopted.

The hygroscopic expansion coefficient of a cellulose acetate film is preferably $30 \times 10^{-5}$/% RH or less, more preferably $15 \times 10^{-5}$/% RH or less, and further preferably $10 \times 10^{-5}$/% RH or less.

A smaller hygroscopic expansion coefficient is preferable, but it usually becomes a value of $1.0 \times 10^{-5}$/% RH or more. The hygroscopic expansion coefficient shows a variation amount of the length of a sample when relative humidity is altered under a constant temperature. By adjusting the hygroscopic expansion coefficient, it is possible to prevent increase in the transmittance in a casing trim shape (light leak caused by warp), while maintaining the optical compensatory function of the optical film.

In measurement of the hygroscopic expansion coefficient, first, a sample having a width of 5 mm and a length of 20 mm is cut out from a polymer film, which is fixed at one end and suspended under an atmosphere of 25° C. and 20% RH (R0). A weight of 0.5 g is suspended at the other end thereof, which is left for 10 minutes. Then, the length (L0) is measured. Next, while maintaining the temperature at 25° C., the humidity is altered to 80% H (R1), and then the length (L1) is measured. The hygroscopic expansion coefficient is calculated according to the following formula. The measurement is carried out for 10 samples from the same film, and the average value is adopted.

Hygroscopic expansion coefficient $[/\% \text{ RH}] = \{(L1-L0)/L0\}/(R1-R0)$

In order to make the variation in dimension of the cellulose acetate film caused by moisture absorption small, addition of a hydrophobic compound is preferable. The hydrophobic compound may be in a fine particle state. The hydrophobic compound to be used is preferably selected from plasticizer or degradation inhibitor. The hydrophobic compound preferably has a hydrocarbon group (aliphatic group, aromatic group) as a hydrophobic group. The addition amount of the hydrophobic compound is preferably 0.01-10% by mass of a polymer solution (dope) to be prepared.

In order to make the variation in dimension of a polymer film caused by moisture absorption small, a method, in which a free volume in the polymer film is made small, is also effective. For example, a less residual solvent amount in an below-mentioned solution casting method results in a small free volume. It is preferable to dry a polymer film under such conditions that make the residual solvent amount be 0.01-1.00% by mass relative to the polymer film.

Examples of the additive for the polymer film include an ultraviolet light inhibitor, a stripping agent, an antistatic agent, a degradation inhibitor (for example, an antioxidant, a peroxide decomposer, a radical inhibitor, a metal deactivator, an acid capturer, amine) and an infrared absorber.

When the polymer film is formed of multiple layers, types or addition amount of the additives in respective layers may differ from one another. As the additive, there is description in KOKAI-GIHO (Disclosure of Techniques) (Kogi No. 2001-1745, p 16-22, published on Mar. 15, 2001 by Japan Institute of Invention and Innovation). Use amount of the additive is generally within a range of 0.001-25% by mass of the polymer film.

The cellulose acetate film is preferably manufactured by a solution casting method. In a solution casting method, a film is manufactured using a solution (dope) prepared by dissolving a polymer material in an organic solvent.

The organic solvent preferably includes a solvent selected from ethers having 3-12 carbon atoms, ketones having 3-12 carbon atoms, esters having 3-12 carbon atoms and halogenated hydrocarbons having 1-6 carbon atoms. The ether, ketone and ester may have a cyclic structure. A compound having any 2 or more functional groups of ether, ketone and ester (that is, —O—, —CO— and —COO—) can be used as the organic solvent. The organic solvent may have another functional group such as an alcoholic hydroxyl group. In the case of an organic solvent having 2 or more types of functional groups, the number of carbon atoms may be within the range specified for a compound having any of the functional groups.

Examples of ethers having 3-12 carbon atoms include diisopropyl ether, dimethoxymethane, dimethoxyethane, 1,4-dioxane, 1,3-dioxolan, tetrahydrofrun, anisole and phenetole. Examples of ketones having 3-12 carbon atoms include acetone, methyl ethyl ketone, diethyl ketone, diisobutyl ketone, cyclohexanone and methylcyclohexanone. Examples of esters having 3-12 carbon atoms include ethyl formate, propyl formate, pentyl formate, methyl acetate, ethyl acetate and pentyl acetate. Examples of organic solvents having 2 or more types of functional groups include 2-ethoxyethyl acetate, 2-methoxyethanol and 2-butoxyethanol. The number of carbon atoms of halogenated hydrocarbons is preferably 1 or 2, and more preferably 1. The halogen of halogenated hydrocarbons is preferably chlorine. In the halogenated hydrocarbon, the percentage of hydrogen atom substituted by halogen is preferably 25-75% by mol, more preferably 30-70% by mol, further preferably 35-65% by mol, and most preferably 40-60% by mol. Methylene chloride is typical halogenated hydrocarbon. Two types or more of organic solvents may be used in a mixture.

The cellulose acetate solution can be prepared by a general method. In a general method, for example, treatment temperature is 0° C. or higher (ordinary or a high temperature). The solution can be prepared using a preparation method and apparatus of a dope in a usual solution casting method. Incidentally, in a usual method, use of a halogenated hydrocarbon (in particular, methylene chloride) as an organic solvent is preferable. The amount of the cellulose acetate is adjusted so as to be contained in 10-40% by mass in an obtained solution. The amount of the cellulose acetate is more preferably 10-30% by mass. To the organic solvent (primary solvent), any of after-mentioned additives may have been added. The solution can be prepared by stirring the cellulose acetate and the organic solvent at ordinary temperature (for example, 0-40° C.). A highly concentrated solution may be stirred under pressurized and heated conditions. Specifically, the cellulose acetate and the organic solvent are put and sealed in a pressurizing vessel, which is stirred while heating the same to a temperature within a range from the boiling point of the solvent under ordinary pressure to a temperature not to boil the solvent. The heating temperature is, for example, 40° C. or more, preferably 60-200° C., and more preferably 80-110° C.

Respective components may be put in the vessel after being roughly mixed. Or, they may be put in the vessel sequentially. The vessel must be constituted so that the components can be stirred. The vessel can be pressurized by injecting an inert gas such as nitrogen gas. Further, vapor pressure rising of the solvent by heating may be utilized. Or, after sealing the vessel, respective components may be added under pressure. When carrying out heating, heating from the outside of the vessel is preferable. For example, a heating apparatus of a jacket type can be used. Or, by arranging a plate heater outside the vessel and arranging a pipe to circulate liquid, heating of the whole vessel is also possible. It is preferable to arrange stirring blades inside the vessel and use the same to stir. The stirring blades preferably have a length that reaches near the wall of the vessel. It is preferable to arrange a scraping blade at the end of the stirring blades in order to renew a liquid film on the wall of the vessel. The vessel may be provided with gauges such as a pressure gauge and thermometer. In the vessel, respective components are dissolved in the solvent. The prepared dope is taken out of the vessel after cooling, or is cooled using a heat exchanger or the like after being taken out.

The solution can be also prepared by a cooling dissolution method. In a cooling dissolution method, cellulose acetate can be also dissolved in an organic solvent in which dissolving the acetate is difficult by an ordinary dissolution method. In this connection, there is such advantage that even a solvent capable of dissolving cellulose acetate by an ordinary dissolution method can give a homogeneous solution rapidly by a cooling dissolution method. In a cooling dissolution method, first, cellulose acetate is gradually added into an organic solvent with stirring at room temperature. The amount of the cellulose acetate is preferably adjusted to give a concentration of 10-40% by mass in the mixture. The amount of the cellulose acetate is more preferably 10-30% by mass. Further, to the mixture, after-mentioned any additives may be added.

Next, the mixture is cooled to, for example, −100° C.−−10° C. (preferably −80° C.−−10° C., more preferably −50° C.−−20° C., further preferably −50° C.−−30° C.). The cooling can be carried out in, for example, a dry ice/methanol bath (−75° C.) or a cooled diethylene glycol solution (−30° C.−−20° C.). By cooling the mixture of the cellulose acetate and the organic solvent in this way, it solidifies. The cooling rate is preferably 4° C./min or more, more preferably 8° C./min or more, and further preferably 12° C./min or more. A larger cooling rate is more preferable, but 10000° C./sec is the theoretical upper limit, 1000° C./sec is the technical upper limit, and 100° C./sec is the practical upper limit. The cooling rate is a value obtained by dividing difference between a temperature at the beginning of the cooling and a finally cooled temperature by time period from the beginning of the cooling up to achievement of a finally cooled temperature.

Further, when the mixture is heated to, for example, 0-200° C. (preferably 0-150° C., more preferably 0-120° C., further preferably 0-50° C.), the cellulose acetate dissolves in the organic solvent. It may be only left at room temperature or heated in a warm bath, to rise the temperature. The rate of temperature rise is preferably 4° C./min or more, more preferably 8° C./min or more, and further preferably 12° C./min or more. A larger rate of temperature rise is more preferable, but 10000° C./sec is the theoretical upper limit, 1000° C./sec is the technical upper limit, and 100° C./sec is the practical upper limit. Incidentally, the rate of temperature rise is a value obtained by dividing difference between a temperature at the beginning of the temperature rise and a finally risen temperature by time period from the beginning of temperature rise up to achievement of a finally risen temperature. In the above-described way, a homogeneous solution is obtained. When dissolution is insufficient, operation of the cooling and the heating may be repeated. Whether or not the dissolution is sufficient can be determined by observing appearance of the solution visually.

In the cooling dissolution method, in order to avoid interfusion of water caused by dew formation at cooling, use of a sealable vessel is desirable. Moreover, such cooling/heating operation as cooling while adding the pressure and heating while reducing the pressure can shorten the dissolution time. In order to practice adding/reducing the pressure, use of a pressure-resistant vessel is desirable. Incidentally, a solution of 20% by mass prepared by dissolving cellulose acetate (degree of acetylation: 60.9%, viscosity-average molecular weight: 299) in methyl acetate by a cooling dissolution method has a pseudo-phase transition point for a sol state and a gel state at around 33° C., according to differential scanning calorimetry (DSC), and shows a homogeneous gel state at the temperature or lower. Accordingly, it is necessary to store the solution at, for example, the pseudo-phase transition point or higher, preferably a temperature around a gel phase transition temperature +10° C. In this connection, the pseudo-phase transition point varies depending on the degree of acetylation or the viscosity-average degree of polymerization of cellulose acetate, concentration of the solution, and an organic solvent to be used.

From the prepared cellulose acetate solution (dope), a cellulose acetate film is manufactured by a solution casting method. The dope is cast on a drum or a band, from which the solvent is evaporated to form a film. The concentration of the dope before casting is preferably adjusted to give a solid content of 18-35%. The surface of the drum or the band has been preferably finished in a mirror-like condition. The casing and drying method in a solution casting method described in U.S. Pat. Nos. 2,336,310, 2,367,603, 2,492,078, 2,492,977, 2,492,978, 2,607,704, 2,739,069, 2,739,070, GB Patent Nos 640731, 736892, JP-B-45-4554, JP-B-49-5614, JP-A-60-176834, JP-A-60-203430, JP-A-62-115035 can be adopted. The dope is preferably cast on a drum or a band having a surface temperature of 10° C. or less. The cast dope is preferably winded for 2 seconds or more after the casting to dry. The obtained film is peeled off the drum or band, which also can be further dried by a high temperature wind whose temperature is gradually altered from 100 to 160° C. to evaporate the residual solvent. The method can be carried out according to the method described in, for example, JP-B-5-17844. According to the method, it is possible to shorten the time from the casting to the peeling off. In order to practice the method, gelation of the dope at the surface temperature of the drum or band at casting is necessary.

By using a prepared cellulose acylate solution (dope), a film is also formed by casting of 2 or more layers. In this case, a cellulose acylate film is preferably formed by a solution casting method. The dope is cast on a drum or a band, from which the solvent is evaporated to form a film. The concentration of the dope before casting is preferably adjusted to give a solid content of 10-40%. The surface of the drum or the band has been preferably finished in a mirror-like condition.

When casting plural cellulose acylate liquids for 2 or more layers, casting of plural cellulose acylate solutions is possible. A film may be formed by casting and laminating respective solutions including cellulose acylate from plural casting openings disposed in the traveling direction of a support with intervals. For example, methods described in JP-A-61-158414, JP-A-1-122419 and JP-A-11-198285 can be applied. A film may be also formed by casting a cellulose acylate solution from 2 casting openings. For example, this can be practiced according to methods described in JP-B-60-27562, JP-A-61-94724, JP-A-61-947245, JP-A-61-104813, JP-A-61-158413 and JP-A-6-134933. Further, a casting method of cellulose acylate film described in, for example, JP-A-56-162617, in which flow of a cellulose acylate solution with a high viscosity is encompassed by a cellulose acylate solution with a low viscosity and the cellulose acylate solutions with a high/low viscosity are extruded at the same time, may be adopted.

Further, a film may be formed using 2 casting openings, in which a film is molded on a support by a first casting opening and peeled off, followed by carrying out a second casting on the side having contacted with the support face. This is the method described in, for example, JP-B-44-20235. The cellulose acylate solution to be cast is not particularly restricted and may be the same solution or different cellulose acylate solutions. In order to give respective functions to plural cellulose acylate layers, each of cellulose acylate solutions corresponding to functions may be extruded from respective casting openings. Furthermore, the cellulose acylate solution for the invention can be simultaneously cast with other functional layers (for example, an adhesive layer, a dye layer, an antistatic layer, an antihalation layer, a UV absorbing layer, a polarizing layer and the like).

In the case of a conventional liquid for a single layer, it was necessary to extrude a cellulose acylate solution with a high concentration and a high viscosity in order to give a necessary film thickness, which often resulted in such problem that the cellulose acylate solution had a poor stability to generate a solid material, thereby leading to fisheye failure or bad flat surface property. In order to solve the problem, for example, by casting plural cellulose acylate solutions from a casting opening, a solution with a high viscosity can be simultaneously extruded on a support, thereby making it possible to form a film having an improved flat surface property and excellent surface conditions, as well as to achieve lowering in drying load caused by use of a concentrated cellulose acylate solution, and to increase production speed of the film.

In order to improve mechanical and physical properties, or to increase drying speed, a plasticizer can be added to the cellulose acetate film. As the plasticizer, phosphoric acid esters or carboxylic acid esters are used. Examples of the phosphoric acid ester include triphenyl phosphate (TPP) and tricresyl phosphate (TCP). As the carboxylic acid ester, phthalic acid esters and citric acid esters are typical. Examples of the phthalic acid ester include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric acid ester include triethyl o-acetylcitrate (OACTE) and tributyl o-acetylcitrate (OACTB). Examples of the other carboxylic acid ester include butyl oleate, methylacetyl ricinoleate, dibutyl sebacate and various trimellitic esters. Phthalic ester-based plasticizers (for example, DMP, DEP, DBP, DOP, DPP, DEHP) are preferably used. DEP and DPP are more preferable. The addition amount of the plasticizer is preferably 0.1-25% by mass, more preferably 1-20% by mass, and further preferably 3-15% by mass on the amount of the cellulose ester.

The cellulose acetate film is preferably subjected to a surface treatment. Examples of the surface treatment include corona discharge treatment, glow discharge treatment, flame treatment, acid treatment, saponification treatment (preferably alkali saponification treatment) and ultraviolet ray irradiation treatment. The surface treatment described in, for example, KOKAI-GIHO (Disclosure of Techniques) (Kogi No. 2001-1745, p 30-32, published on Mar. 15, 2001 by Japan Institute of Invention and Innovation) can be adopted.

Alkali saponification treatment is practiced by dipping the cellulose acetate film in a saponification liquid, or coating a saponification liquid on the cellulose acetate film. A method by coating is preferable. Examples of the coating method include a dip coating method, a curtain coating method, an extrusion coating method, a bar coating method and an E-type coating method. As the alkali, hydroxides of alkali metals (for example, potassium, sodium) are preferable. That is, an alkali treatment liquid is preferably a solution of a hydroxide of an alkali metal. The normal concentration of hydroxide ion in the solution is preferably 0.1-3.0 N.

By dissolving a solvent having a good wettability to the film, or adding a surfactant or a wetting agent (for example, diol, glycerin) in an alkali treatment liquid, wettability of the alkali treatment liquid to the optically anisotropic layer (2) or stability of the treatment liquid can be improved. Solvents having good wettability to the film are, for example, alcohols (for example, isopropyl alcohol, n-butanol, methanol, ethanol). As to additives for the alkali treatment liquid, JP-A-2002-82226 and WO 02/46809 can be referred to.

In place of the surface treatment, or in addition to the surface treatment, an undercoating layer may be provided. An undercoating layer can be provided by the method described in, for example, JP-A-7-333433. Plural undercoating layers may be provided. For example, it is possible to provide a polymer layer having both of a hydrophobic group and a hydrophilic group as a first undercoating layer, and to provide a hydrophilic polymer layer having a good adhesiveness with an alignment film thereon as a second undercoating layer. In this case, for example, the method described in JP-A-11-248940 can be adopted.

(Alignment Film)

An alignment film can be provided by such means as rubbing treatment of an organic compound (preferably a polymer), oblique evaporation of an inorganic compound, formation of a micro groove layer, or accumulation of an organic compound (for example, ω-tricosanoic acid, dioctadecylmethylammonium chloride, methyl stearate) according to a Langmuir-Blodgett method (LB film). Further, alignment films that generate alignment function by application of an electric field, application of a magnetic field, or irradiation of light are known.

An alignment film is preferably formed by a rubbing treatment of a polymer. A polymer for use in an alignment film has, in principle, a molecular structure with a function capable of aligning liquid crystalline compounds.

In addition to a function of aligning liquid crystalline compounds, a polymer for use in an alignment film preferably has a function of fixing the alignment of liquid crystalline compounds. For example, this can be achieved by bonding a side chain having a cross-linkable functional group (for example, a double bond) to a main chain of a polymer, or introducing a cross-linkable functional group having a function of aligning liquid crystalline compounds into a side chain of a polymer.

Preferably a polymer for use in an alignment film is cross-linkable in itself, or becomes cross-linkable by use of a cross-linking agent. Cross-linkable polymers described in, for example, paragraph number 0022 of JP-A-8-338913 can be adopted. Examples of the cross-linkable polymer include polymethacrylate, polystyrene, polyolefin, polyvinyl alcohol, modified polyvinyl alcohol, poly(N-methylol acrylamide), polyester, polyimide, polyvinyl acetate, carboxymethyl cellulose, polycarbonate and copolymers of these. A silane coupling agent can be also used as a polymer. Water-soluble polymers (for example, poly(N-methylol acrylamide), carboxymethyl cellulose, gelatin, polyvinyl alcohol, modified polyvinyl alcohol) are preferable, gelatin, polyvinyl alcohol and modified polyvinyl alcohol are more preferable, and polyvinyl alcohol and modified polyvinyl alcohol are most preferable. Simultaneous use of 2 or more types of polyvinyl alcohol or modified polyvinyl alcohol having different degrees of polymerization is particularly preferable.

The degree of saponification of polyvinyl alcohol is preferably 70-100%, and more preferably 80-100%. The degree of polymerization of polyvinyl alcohol is preferably 100-5000.

A side chain having a function of aligning liquid crystalline compounds generally has a hydrophobic group as a functional group. A specific type of the functional group is determined according to a type of the liquid crystalline compound and a necessary alignment condition.

A modifying group of modified polyvinyl alcohol can be introduced by copolymerization modification, chain transfer modification or block polymerization modification. Examples of the modifying group include hydrophilic groups (for example, a carboxylic acid group, a sulfonic acid group, a phosphonic acid group, amino, ammonio, amido, thiol), hydrocarbon groups having 10-100 carbon atoms, fluorine atom-substituted hydrocarbon groups, alkylthio groups, polymerizable groups (for example, unsaturated polymerizable groups, an epoxy group, an azirinidyl group) and alkoxysilyl groups (trialkoxysilyl, dialkoxysilyl, monoalkoxysilyl).

Modified polyvinyl alcohols described in, for example, JP-A-2000-155216 and JP-A-2002-62426 can be adopted.

By bonding a side chain having a cross-linkable functional group to a main chain of an alignment film polymer, or by introducing a cross-linkable functional group into a side chain having a function of aligning liquid crystalline compounds, a polymer of an alignment film and a polyfunctional monomer included in the optically anisotropic layer (1) can be copolymerized. As the result, not only between the polyfunctional monomer and the polyfunctional monomer, but also between the alignment film polymer and the alignment film polymer, and further between the polyfunctional monomer and the alignment film polymer are solidly bonded through a covalent bond. Accordingly, by introducing a cross-linkable functional group into an alignment film polymer, the strength of an optical film can be significantly improved.

As the cross-linkable functional group of an alignment film polymer, a polymerizable group is preferable as is the case for the polyfunctional monomer. Cross-linkable functional groups described in, for example, paragraph numbers 0080-0100 of JP-A-2000-155216 can be adopted.

The alignment film polymer can be also cross-linked using a cross-linking agent instead of a cross-linkable functional group. Examples of the cross-linking agent include aldehydes, N-methylol compounds, dioxane derivatives, compounds operating by activating a carboxylic group, activated vinyl compounds, activated halogenated compounds, isooxazole and dialdehyde starch. 2 or more types of cross-linking agents may be simultaneously used. Cross-linking agents described in, for example, JP-A-2002-62426 can be adopted. Since it has a high reaction activity, aldehyde is preferable, and glutaric aldehyde is more preferable.

The addition amount of the cross-linking agent is preferably 0.1-20% by mass, and more preferably 0.5-15% by mass relative to the polymer. The residual amount of an unreacted cross-linking agent in the alignment film is preferably 1.0% by mass or less, and more preferably 0.5% by mass or less. By reducing the residual amount of a cross-linking agent, even when a liquid crystal display device is used for a long period, or when a liquid crystal display device is left under atmospheres of high temperature and high humidity for a long period, sufficient durability without generation of reticulation can be obtained.

An alignment film can be formed by, for example, applying an alignment film coating liquid including the above-described polymer and cross-linking agent on the optically anisotropic layer (2), followed by heating and drying (to form cross-linking), and then rubbing treatment. A cross-linking reaction is carried out after applying the liquid on the optically anisotropic layer (2). When a water-soluble polymer such as polyvinyl alcohol is used as an alignment film-forming material, the coating liquid preferably includes a mixed solvent of an organic solvent having a defoaming function (for example, methanol) and water. In the case of a mixed solvent of water and methanol, methanol is included preferably in 1% by mass or more, and more preferably in 9% by mass or more relative to the whole solvent. The addition of an organic solvent more inhibits generation of foams to further reduce defects of the surface of the alignment film and the optically anisotropic layer (1).

Such coating method is preferable for the alignment film as a spin coating method, a dip coating method, a curtain coating method, an extrusion coating method, a rod coating method or a roll coating method. Particularly, a rod coating method is preferable.

The film thickness after drying is preferably 0.1-10 μm.

Drying by heating can be carried out at 20-110° C. For the purpose of forming sufficient cross-linking, 60-100° C. is preferable, and 80-100° C. is more preferable. The drying time can be 1 minute-36 hours, and preferably 1-30 minutes. pH is preferably set to a value that is most appropriate for a cross-linking agent to be used. When glutaric aldehyde is used, preferable pH is 4.5-5.5.

An alignment film can be obtained by carrying out rubbing treatment for the surface.

The rubbing treatment is similar to the treatment method being widely adopted as the liquid crystal alignment process of an LCD. That is, rubbing of the surface of an alignment film in a certain direction by using paper, gauze, felt, rubber, or nylon or polyester fiber gives alignment. Generally, rubbing is carried out several times using a cloth averagely transplanted with fibers having uniform length and thickness.

(Polarizing Plate)

The optically anisotropic layer (2) and the optically anisotropic layer (1) are laminated with a polarizing film, which is used as a polarizing plate.

The polarizing film includes an alignment type polarizing film or a coating type polarizing film (manufactured by Optiva Inc.). An alignment type polarizing film is composed of a binder, and iodine or dichroic dye. Iodine and dichroic dye align in the binder to generate polarizing performance. Preferably iodine and dichroic dye align along with the binder molecule, or align in one direction by self-organization as is the case for liquid crystal.

A commercially available alignment type polarizing film is manufactured by dipping a stretched polymer in an iodine or dichroic dye solution in a bath to allow iodine or dichroic dye to penetrate into the binder. In a commercially available polarizing film, iodine or dichroic dye distributes within a range of around 4 μm from the surface of the polymer (around 8 μm by summing the both sides), and at least a thickness of 10 μm is necessary in order to obtain sufficient polarizing performance. The degree of penetration can be controlled through the solution concentration of iodine or cichroic dye, bath temperature and dipping time.

The thickness of a polarizing film is preferably not more than that of now commercially available polarizing plates (about 30 μm), more preferably 25 μm or less, and most preferably 20 μm or less. By setting it to 20 μm or less, the light leaking phenomenon becomes completely unobservable in a 17-inch liquid crystal display device, which is more preferable.

The binder for a polarizing film may have cross-linked. As the binder for a polarizing film, a polymer cross-linkable in itself may be used. A polarizing film can be formed by giving optical, thermal or pH alteration to a polymer having a functional group or a polymer obtained by introducing a functional group to a polymer, and reacting functional groups to form cross-link between the polymers. A cross-link structure may be also introduced to the binder by a cross-linking agent. It can be formed, while using a cross-linking agent being a compound having a high reaction activity, by introducing a bonding group derived from the cross-linking agent between the polymers to form cross-link between the polymers.

Cross-link can be generally practiced by applying a coating liquid containing a cross-linkable polymer, or a mixture of a polymer and a cross-linking agent on a support (preferably a transparent support), followed by heating the same. Since securement of durability for a final product will suffice, the treatment for cross-linking may be carried out at any step before giving a final polarizing plate.

As a binder for a polarizing film, a polymer cross-linkable in itself, or a polymer to be cross-linked by a cross-linking agent can be used. Examples of the polymer include polymethyl methacrylate, polyacrylic acid, polymethacrylic acid, polystyrene, polyvinyl alcohol, modified polyvinyl alcohol, poly(N-methylol acrylamide), polyvinyl toluene, chlorosulfonated polyethylene, nitrocellulose, chlorinated polyolefin (for example, polyvinyl chloride), polyester, polyimide, polyvinyl acetate, polyethylene, carboxymethyl cellulose, polypropylene, polycarbonate and copolymers of these (for example, acrylic acid/methacrylic acid copolymer, styrene/maleimide copolymer, styrene/vinyl toluene copolymer, vinyl acetate/vinyl chloride copolymer, ethylene/vinyl acetate copolymer). A silane coupling agent may be also used as polymer. Water-soluble polymers (for example, poly(N-methylol acrylamide), carboxymethyl cellulose, gelatin, polyvinyl alcohol and modified polyvinyl alcohol) are preferable, gelatin, polyvinyl alcohol and modified polyvinyl alcohol are more preferable, and polyvinyl alcohol and modified polyvinyl alcohol are most preferable.

The degree of saponification of polyvinyl alcohol and modified polyvinyl alcohol is preferably 70-100%, more preferably 80-100%, and most preferably 95-100%. The degree of polymerization of polyvinyl alcohol is preferably 100-5000.

Modified polyvinyl alcohol can be obtained by introducing a modifying group to polyvinyl alcohol by copolymerization modification, chain transfer modification or block polymerization modification. Examples of the modifying group to be introduced by copolymerization include —COONa, —Si(OX)$_3$ (X is a hydrogen atom or an alkyl group), —N(CH$_3$)$_3$·Cl, —C$_9$H$_{19}$, —COO, —SO$_3$Na and —C$_{12}$H$_{25}$. Examples of the modifying group to be introduced by chain transfer include —COONa, —SH and —SC$_{12}$H$_{25}$. The degree of polymerization of modified polyvinyl alcohol is preferably 100-3000. Modified polyvinyl alcohols described in, for example, JP-A-8-338913, JP-A-9-152509 and JP-A-9-316127 can be adopted. Among these, an unmodified polyvinyl alcohol having a degree of saponification of 85-95% and alkylthio-modified polyvinyl alcohols are particularly preferable.

Two or more types of polyvinyl alcohols and modified polyvinyl alcohols may be simultaneously used.

Cross-linking agents described in, for example, U.S. Reissue Pat, No. 23,297 can be adopted. Boron compounds (for example, boric acid, borax) can be also used as a cross-linking agent.

A cross-linking agent for a binder can enhance moisture and heat resistance of a polarizing film when it is added in a large amount. But, when the cross-linking agent is added in 50% by mass or more relative to the binder, alignment property of iodine or dichroic dye lowers. The addition amount of the cross-linking agent is preferably 0.1-20% by mass, and more preferably 0.5-15% by mass relative to the binder. The binder contains a certain level of the unreacted cross-linking agent even after the end of cross-linking reaction. But the residual amount of the cross-linking agent is preferably 1.0% by mass or less, and more preferably 0.5% by mass or less in the binder. By lowering it to 1.0% by mass or less, durability tends to be enhanced. That is, by lowering the residual amount of the cross-linking agent, the degree of polarization tends to lower not easily when the polarizing film is assembled in a liquid crystal display device and used for a long period or left under atmospheres of high temperature and high humidity for a long period.

Examples of the dichroic dye include azo-containing dyes, stilbene-containing dyes, pyrazolone-containing dyes, triphenylmethane-containing dyes, quinoline-containing dyes, oxazine-containing dyes, thiazine-containing dyes and anthraquinone-containing dyes. The dichroic dye is preferably water-soluble. The dichroic dye preferably has a hydrophilic substituent (for example, sulfo, amino, hydroxyl). Examples of the dichroic dye include C.I. Direct Yellow 12, C.I. Direct Orange 39, C.I. Direct Orange 72, C.I. Direct Red 39, C.I. Direct Red 79, C.I. Direct Red 81, C.I. Direct Red 83, C.I. Direct Red 89, C.I. Direct Violet 48, C.I. Direct Blue 67, C.I. Direct Blue 90, C.I. Direct Green 59 And C.I. Acid Red 37. Dichroic dyes described in, for example, JP-A-1-161202, JP-A-1-172906, JP-A-1-172907, JP-A-1-183602, JP-A-1-248105, JP-A-1-265205 and JP-A-7-261024 can be adopted.

The dichroic dye is used as a free acid or a salt (for example, alkali metal salt, ammonium salt or amine salt). By blending 2 or more types of dichroic dyes, polarizing films having various hues can be manufactured. A polarizing film using a compound (dye) that generates black, or blending various types of dichroic dyes so as to express black when polarizing axes are orthogonalized has an excellent single plate transmittance and polarization ratio.

In the polarizing film, the binder is stretched in the longitudinal direction (MD direction) of the polarizing film (stretching method). Or, after rubbing, it is stained with iodine or dichroic dye (rubbing method). In the stretching method, the draw ratio is preferably 2.5-30.0, and more preferably 3.0-10.0. The stretching can be practiced by dry stretching in air. Further, wet stretching in a state immersed in water may be also practiced. The draw ratio in dry stretching is preferably 2.5-5.0, and the draw ratio in wet stretching is preferably 3.0-10.0. The stretching process may be carried out in several batches. The operation in several batches can result in more uniform stretching even at a high draw ratio. Before the stretching, some amount of stretching (at a degree of preventing contraction in width direction) may be carried out laterally or longitudinally.

From the view point of process yield, stretching is preferably carried out in a direction inclining 10-80° relative to the longitudinal direction. In this case, the stretching can be practiced by carrying out tenter stretching in biaxial stretching through different processes on the right and left sides. The above-described biaxial stretching is similar to stretching methods carried out in ordinary film forming. In the biaxial stretching, since the film is stretched at different speeds on the right and left sides, it is necessary that the binder film before stretching has different thicknesses on the right and left sides. In casting film forming, by arranging taper to a die, it is possible to provide a difference in a flow amount of the binder solution on right and left sides.

The stretching is preferably carried out so that the tilt angle is controlled to coincide to an angle between the transmission axis of 2 polarizing plates laminated on both sides of a liquid crystal cell constituting a liquid crystal display device and the longitudinal or lateral direction of the liquid crystal cell. An ordinary tilt angle is 45°. However, recently, a device having not necessarily a tilt angle of 45° is developed in liquid crystal display devices of transmissive, reflective and semi-transmissive mode. Therefore, it is preferable that the stretching direction is arbitrarily adjustable in accordance with the design of a liquid crystal display device.

As mentioned above, a binder film which has been obliquely stretched in 10-80° relative to the MD direction of a polarizing film is manufactured.

In the rubbing method, rubbing treatment methods widely adopted as a liquid crystal alignment treatment process for a liquid crystal display device can be applied. That is, rubbing of the surface of a film in a certain direction using paper, gauze, felt, rubber, or nylon or polyester fiber gives alignment. Generally, it is practiced by carrying out rubbing several times using a cloth averagely transplanted with fibers having uniform length and thickness. It is preferably practiced using rubbing rolls having each 30 µm or less of circularity, cylindricality and deflection (eccentricity) of the roll itself. The lap angle of the film to the rubbing roll is preferably 0.1-90°. But, for example, as described in JP-A-8-160430, a stable rubbing treatment can be also obtained by wrapping the film at 360° or more.

When a film of long sheet is subjected to the rubbing treatment, it is preferable to convey the film by a conveying apparatus at a rate of 1-100 m/min in a state of constant tension. In order to set an arbitrary rubbing angle, the rubbing roll is preferably constituted so that it can freely rotate in the horizontal direction relative to the traveling direction of the film. Selection of a suitable rubbing angle within a range of 0-60° is preferable. When used for a liquid crystal display device, 40-50° is preferable, and 45° is more preferable.

On both faces of a polarizing film, a protective film is preferably arranged. As the protective film on one face, a part of a roll-shaped optical film is preferably used. For example, a laminated body, in which a protective film/a polarizing film/an optically anisotropic layer (2)/an optically anisotropic layer (1), or a protective film/a polarizing film/an optically anisotropic layer (2)/an alignment film/an optically anisotropic layer (1) are laminated in this order, is preferable. The polarizing film and the front face side of the optically anisotropic layer (1) may be stuck. For the sticking, an adhesive can be used. Polyvinyl alcohol-based resins (including polyvinyl alcohols modified by an acetoacetyl group, a sulfonic acid group, a carboxyl group, or an oxyalkylene group) or an aqueous solution of a boron compound can be used as an adhesive. The polyvinyl alcohol-based resin is preferable.

The thickness of the adhesive layer is preferably 0.01-10 μm, and more preferably 0.05-5 μm after drying.

The surface of the polarizing plate may be stuck with a light diffusing film or an antidazzle film.

(Light Diffusing or Antidazzle Film)

Figure 4:
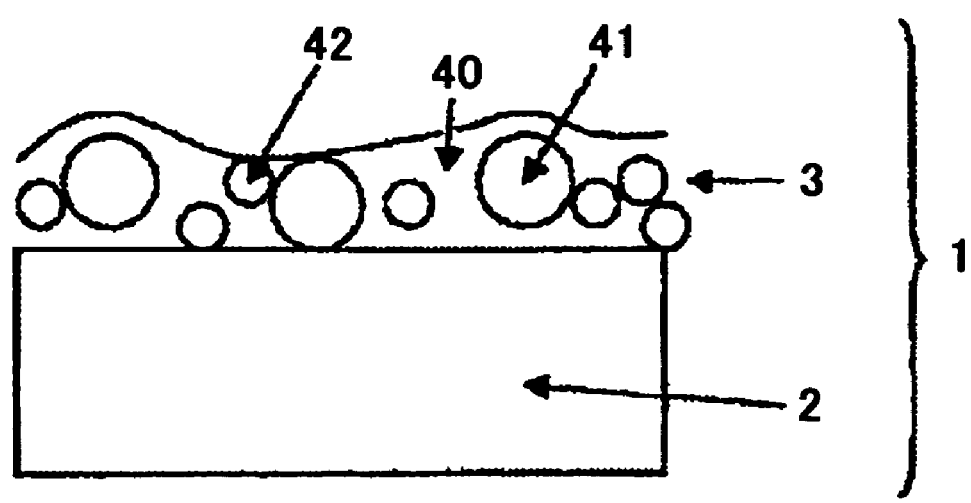
FIG. 4 is a cross-sectional schematic drawing showing a typical shape of an optical diffusion film.

FIG. 4 is a schematic cross-sectional view showing a typical configuration of a light diffusing film.

The light diffusing film (1) shown in FIG. 4 is composed by laminating a transparent base film (2) and a light diffusing layer (3) containing, for example, first light transmissive fine particles (41) and second light transmissive fine particles (42), in a light transmissive resin (40). The description is given here based on 2 types (having different refractive indices) of light transmissive fine particles having 2 peaks of particle size distribution. But the same types (having the same refractive index) of light transmissive fine particles having 2 peaks in a particle size distribution line, or 1 type of light transmissive fine particles may be used.

The first light transmissive fine particle (41) is composed of a light transmissive resin, for example, silica fine particles (average particle size: 10 μm, refractive index: 1.51), and the second light transmissive fine particle (42) is composed of a light transmissive resin, for example, styrene beads (average particle size: 3.5 μm, refractive index: 1.61). The light diffusing function can be obtained based on the difference in refractive indices between the light transmissive fine particles (41 and 42) and the light transmissive resin (40). The difference in the refractive indices is preferably 0.02-0.15. By setting the difference in the refractive indices to 0.02 or more, light diffusion is more effective. On the other hand, by setting the difference in the refractive indices to 0.15 or less, light diffuseness tends not to become too high, and to further suppress whitening of the whole film. The difference in the refractive indices is more preferably 0.03-0.13, and further preferably 0.04-0.10.

When the polarizing film is used for a liquid crystal display device, an antireflection layer is preferably placed to the surface on the viewer side. The antireflection layer may also have a function of a protective layer on the viewer side of the polarizing film. From the viewpoint of suppressing hue alteration of a liquid crystal display device depending on view angles, the internal haze of the antireflection layer is preferably set to 50% or more. Antireflection layer described in JP-A-2001-33783, JP-A-2001-343646 and JP-A-2002-328228 can be adopted.

(OCB Mode Liquid Crystal Display Device)

An OCB mode liquid crystal cell is a liquid crystal cell of bend alignment mode, in which rod-shaped liquid crystalline compounds are aligned in substantially opposite directions (symmetrically) in the upper and lower portions of the liquid crystal cell. Liquid crystal display devices using a liquid crystal cell of the bend alignment mode described in U.S. Pat. Nos. 4,583,825 and 5,410,422 can be applied. Since rod-shaped liquid crystalline compounds are symmetrically aligned in the upper and lower portions of the liquid crystal cell, the liquid crystal cell of the bend alignment mode has a self-optical compensatory function. Therefore, this liquid crystal mode is also referred to as OCB (Optically Compensatory Bend) liquid crystal mode.

As is the case for TN mode, at the time of black level, a liquid crystal cell of OCB mode is also in such alignment condition in the liquid crystal cell that the rod-shaped liquid crystalline compound rises at the center portion of the cell, and that the rod-shaped liquid crystalline compound lies near the substrate of the cell.

The Δn×d value of the liquid crystal cell is preferably 50-1000 nm, and more preferably 500-1000 nm.

With regard to hue of a liquid crystal display device, evaluation was carried out on CIE 1976 (u'v') chromaticity diagram in the invention. Specifically, hue is measured using a spectral luminance meter (SR-3, manufactured by TOPCON) in a black state and (u'v') is derived from internal calculation. Evaluation of a black state according to a general polarizing plate gives v', which indicates bluish hue, of around 0.45. When v' of a liquid crystal display device at the time of black level comes closer to this value, it can be said that there is no problem in the black level. Specifically, v' is preferably 0.40-0.45.

EXAMPLES

Hereinafter, the invention will be described more specifically on the basis of Examples. Material, use amount, percentage, treatment content, treatment procedure and the like shown in the following Examples can be arbitrarily changed within a range that does not result in deviation from the purpose of the invention. Accordingly, the scope of the invention should not be construed restrictively by specific examples shown below.

Example 1

(Preparation of Cellulose Acetate Solution)

The composition shown below was put in a mixing tank, which was stirred with heating to dissolve respective components, thereby preparing a cellulose acetate solution.

| Composition of a cellulose acetate solution | |
|---|---|
| Cellulose acetate having a degree of acetylation of 60.9% | 100 parts by mass |
| Triphenyl phosphate | 7.8 parts by mass |
| Biphenyldiphenyl phosphate | 3.9 parts by mass |
| Methylene chloride | 300 parts by mass |
| Methanol | 45 parts by mass |

In another mixing tank, 4 parts by mass of cellulose acetate (linter) having a degree of acetylation of 60.9%, 25 parts by mass of the following retardation increasing agent, 0.5 parts by mass of silica fine particles (average particle size: 20 nm), 80 parts by mass of methylene chloride and 20 parts by mass of methanol were put, which were stirred with heating to prepare a retardation increasing agent solution.

Retardation Increasing Agent:

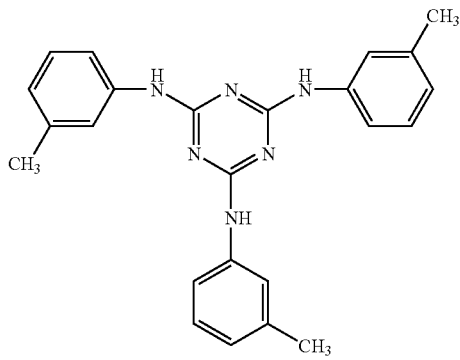

(Manufacture of Optically Anisotropic Layer (2))

To 470 parts by mass of the cellulose acetate solution, 18.5 parts by mass of the retardation increasing agent solution was mixed, which were stirred sufficiently to prepare a dope. The mass ratio of the retardation increasing agent relative to the cellulose acetate was 3.5% by mass. A film including 35% by mass of residual solvent was peeled off a band, followed by lateral stretching at a draw ratio of 38% using a tenter for a film at 140° C., which was dried at 130° C. for 45 seconds after unfastening clips to manufacture a cellulose acetate film as the optically anisotropic layer (2). The manufactured optically anisotropic layer (2) contained the residual solvent amount of 0.2% by mass, and had a thickness of 88 μm.

(Measurement of Optical Properties)

For the manufactured optically anisotropic layer (2), a retardation value Re2(550) was measured using KOBRA 21ADH (manufactured by Oji Scientific Instruments) with light of a wavelength 550 nm to give 45 nm. Further, retardation values Re2(40°) and Re2(−40°), which were values when tilted by ±40° using an in-plane slow phase axis as a tilting shaft, were measured. Rth2(550) calculated by an ellipsometer from these observation results was 175 nm.

(Saponification Treatment of Optically Anisotropic Layer (2))

On one face of the manufactured optically anisotropic layer (2), a 1.5 N isopropyl alcohol solution of potassium hydroxide was applied in 25 ml/m², which was left at 25° C. for 5 seconds, and then washed with flowing water for 10 seconds, to which air at 25° C. was blown to dry the surface of the film. Thus, only one surface of the optically anisotropic layer (2) was saponified.

(Formation of Alignment Film)

On one face of the saponified optically anisotropic layer (2), an alignment film coating liquid having the composition shown below was applied with a wire bar coater of #14 in 24 ml/m², which was dried with hot air at 60° C. for 60 seconds, and further with hot air at 90° C. for 150 seconds.

Then, the formed film was subjected to a rubbing treatment in the direction of 45° relative to the stretching direction (approximately perpendicular to the slow phase axis) of the optically anisotropic layer (2).

| Composition of an alignment film coating liquid | |
|---|---|
| Modified polyvinyl alcohol sown below | 10 parts by mass |
| Water | 371 parts by mass |
| Methanol | 119 parts by mass |

| -continued | |
|---|---|
| Composition of an alignment film coating liquid | |
| Glutaric aldehyde (cross-linking agent) | 0.5 parts by mass |

Modified polyvinyl alcohol:

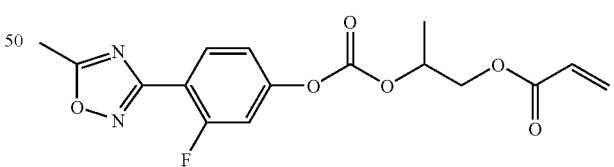

(Manufacture of Optically Anisotropic Layer (1))

A coating liquid was prepared by dissolving 100 parts by mass of a discotic liquid crystalline compound (D) shown below, 0.4 parts by mass of an air interface alignment control agent V-(1) shown below, 3 parts by mass of a photo polymerization initiator (Irgacure 907, manufactured by Ciba-Geigy Corp.) and 1 part by mass of a sensitizer (Kayacure DETX, manufactured by NIPPON KAYAKU CO., LTD.) in 400.0 parts by mass of methyl ethyl ketone. The coating liquid was applied on the alignment film with a wire bar of #3.0, which was set to a metal frame and heated in a constant-temperature bath at 120° C. for 90 seconds to align the discotic liquid crystalline compound (D). Next, using a high pressure mercury lamp of 120 W/cm, ultraviolet rays were irradiated at 80° C. for 1 minute to polymerize the discotic liquid crystalline compound. Then, it was cooled down to room temperature. In this way, the optically anisotropic layer (1) was formed and an optical compensatory sheet was manufactured. Discotic liquid crystalline compound (D):

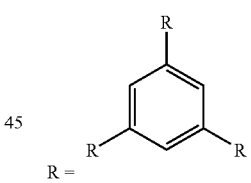

Air Interface Alignment Control Agent V-(1):

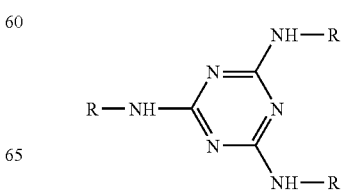

-continued

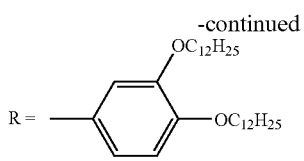

(Measurement of Optical Properties)

The alignment film and the optically anisotropic layer (1) were formed on a glass plate by the same technique as described above. A retardation value Re(550) of the optically anisotropic layer (1) was measured using KOBRA 21ADH (manufactured by Oji Scientific Instruments) with light of a wavelength 550 nm to give 33 nm. Further, retardations were measured using KOBRA 21ADH (manufactured by Oji Scientific Instruments) with light of a wavelength of 450 nm or 650 nm to give Re(450)/Re(650) of 1.15. The thickness of the optically anisotropic layer (1) was measured to give 0.8 μm.

The discotic liquid crystalline compound (D) was poured with heating in a glass cell of 2 μm for parallel aligning the director of the discotic liquid crystalline compound in plane, which was left for 2 minutes. The retardation value Re_m (550) was measured for the cell using KOBRA 21ADH (manufactured by Oji Scientific Instruments) with light of a wavelength 550 nm to give 235 nm. Since the cell gap was 2 μm, the Re_m(550)/d value was 0.118.

(Manufacture of Elliptically Polarizing Plate)

A polarizing film was manufactured by adsorbing iodine to a stretched polyvinyl alcohol film (PVA124H, manufactured by KURARAY CO., LTD.). Next, the manufactured optically anisotropic layer (2) side was stuck on one side of the polarizing film using a polyvinyl alcohol-based adhesive, wherein the slow phase axis of the optically anisotropic layer (2) and the transmission axis of the polarizing film were arranged to be parallel.

(Manufacture of Bend Alignment Liquid Crystal Cell)

To a glass substrate provided with an ITO electrode, a polyimide film was provided as an alignment film, which was subjected to rubbing treatment. The obtained 2 glass substrates were arranged face-to-face so that the rubbing direction became parallel to each other, wherein the cell gap was set to 4.1 μm. In the cell gap, a liquid crystalline compound (ZLI1132, manufactured by Merck & Co., Inc.) having Δn (550) of 0.1396 was poured to manufacture a bend alignment liquid crystal cell.

(Manufacture and Evaluation of Bend Alignment Mode Liquid Crystal Display Device)

The liquid crystal cell and 2 polarizing plates were assembled to manufacture a liquid crystal display device shown in FIG. 3. The liquid crystal cell and 2 polarizing plates were arranged so that respective optically anisotropic layers (1) of the polarizing plate faced to the substrate of the liquid crystal cell, and that the rubbing direction of the liquid crystal cell and the rubbing direction of the optically anisotropic layer (1) facing to it became antiparallel.

The manufactured liquid crystal display device was placed on a backlight, and voltage in 55 Hz block pulse was applied to the bend alignment liquid crystal cell. While using a luminance meter (BM-5, manufactured by TOPCON), the voltage was adjusted to determine the voltage that gave the least black luminance (front luminance). Next, black luminance and white luminance (front luminance) at the center of the screen was measured in the same way using the luminance meter to calculate the contrast. Further, while altering the voltage, luminance in the top, bottom, right and left directions of the screen was measured using the luminance meter to determine presence or absence of generation of gradation reversal. Hue in the black state was also measured using a spectral luminance meter (SR-3, manufactured by TOPCON). Furthermore, using a measuring instrument (EZ-CONTRAST), view angle was measured. The results are shown in Table 1.

Two commercially available linear polarizing plates were constituted so that their transmission axes became orthogonal, which were placed on a backlight to measure hue in black state with SR-3. The v' was 0.45.

Comparative Example 1

The optically anisotropic layer (2) and the alignment film were manufactured in a way similar to that in Example 1.

(Manufacture of Optically Anisotropic Layer (1-1))

A coating liquid was prepared by dissolving 91 parts by mass of discotic liquid crystalline compound (DX) shown below, 9 parts by mass of ethylene oxide-modified trimethylolpropane triacrylate (V#360, manufactured by OSAKA ORGANIC CHEMICAL INDUSTRY LTD.), 0.4 parts by mass of above-described air interface alignment control agent V-(1), 1 part by mass of cellulose acetate butyrate (CAB531-1, manufactured by Eastman Chemical Company), 3 parts by mass of a photo polymerization initiator (Irgacure 907, manufactured by Ciba-Geigy Corp.), 1 part by mass of a sensitizer (Kayacure DETX, manufactured by NIPPON KAYAKU CO., LTD.) in 400.0 parts by mass of methyl ethyl ketone. The coating liquid was applied on the alignment film with a #3.0 wire bar, which was set to a metal frame and heated in a constant-temperature bath at 120° C. for 90 seconds, then, using a high pressure mercury lamp of 120 W/cm, ultraviolet rays were irradiated at 110° C. for 1 minute to polymerize the discotic liquid crystalline compound (DX). Then, it was cooled down to room temperature. In this way, an optically anisotropic layer (1-1) was formed and an optical compensatory sheet was manufactured.

Discotic Liquid Crystalline Compound (DX):

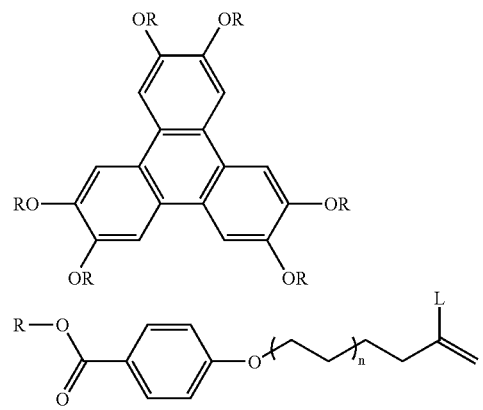

n = 4, L = H (Measurement of Optical Properties)

The alignment film was manufactured on a glass in a way similar to that in Example 1, and the optically anisotropic layer (1-1) was formed in a way as described above. A retardation value Re(550) of the optically anisotropic layer (1-1)

was measured using KOBRA 21ADH (manufactured by Oji Scientific Instruments) with light of a wavelength 550 nm to give 18.7 nm. Further, retardations were measured using KOBRA 21ADH (manufactured by Oji Scientific Instruments) with light of a wavelength of 450 nm or 650 nm to give Re(450)/Re(650) of 1.27. The thickness of the optically anisotropic layer (1-1) was measured to give 0.8 μm.

The discotic liquid crystalline compound (DX) was poured with heating in a glass cell of 2 μm for parallel aligning the director of the discotic liquid crystalline compound in plane, which was left for 2 minutes. The retardation value Re_m (550) was measured for the cell using KOBRA 21ADH (manufactured by Oji Scientific Instruments) with light of a wavelength 550 nm to give 168 nm. Since the cell gap was 2 μm, the Re_m(550)/d value was 0.084.

(Manufacture of Elliptically Polarizing Plate)

The elliptically polarizing plate was manufactured in a way similar to that in Example 1.

(Manufacture of Bend Alignment Mode Liquid Crystal Display Device)

A bend alignment liquid crystal cell and a liquid crystal display device were manufactured in a way similar to that in Example 1 to be a liquid crystal display device in Comparative Example 1. The evaluation results are shown in Table 1.

Comparative Example 2

The optically anisotropic layer (2) and the alignment film were manufactured in a way similar to that in Example 1.

(Manufacture of Optically Anisotropic Layer (1-2))

A coating liquid was prepared by dissolving 91 parts by mass of discotic liquid crystalline compound (DX), 9 parts by mass of ethylene oxide-modified trimethylolpropane triacrylate (V#360, manufactured by OSAKA ORGANIC CHEMICAL INDUSTRY LTD.), 0.4 parts by mass of above-described air interface alignment control agent V-(1), 1 part by mass of cellulose acetate butyrate (CAB531-1, manufactured by Eastman Chemical Company), 3 parts by mass of a photo polymerization initiator (Irgacure 907, manufactured by Ciba-Geigy Corp.), 1 part by mass of a sensitizer (Kayacure DETX, manufactured by NIPPON KAYAKU CO., LTD.) in 204.0 parts by mass of methyl ethyl ketone. The coating liquid was applied on the alignment film with a #3.4 wire bar, which was set to a metal frame and heated in a constant-temperature bath at 120° C. for 90 seconds, then, using a high pressure mercury lamp of 120 W/cm, ultraviolet rays were irradiated at 110° C. for 1 minute to polymerize the discotic liquid crystalline compound (DX). Then, it was cooled down to room temperature. In this way, an optically anisotropic layer (1-2) was formed and an optical compensatory sheet was manufactured.

However, when the alignment was checked with a polarizing microscope, a lot of schlieren defects were observed to show that no alignment had occurred.

Comparative Example 3

The optically anisotropic layer (2) and the alignment film were manufactured in a way similar to that in Example 1.

(Manufacture of Optically Anisotropic Layer (1-3))

A coating liquid was prepared by dissolving 91 parts by mass of discotic liquid crystalline compound (DX), 9 parts by mass of ethylene oxide-modified trimethylolpropane triacrylate (V#360, manufactured by OSAKA ORGANIC CHEMICAL INDUSTRY LTD.), 0.4 parts by mass of above-described air interface alignment control agent V-(1), 1 part by mass of cellulose acetate butyrate (CAB531-1, manufactured by Eastman Chemical Company), 3 parts by mass of a photo polymerization initiator (Irgacure 907, manufactured by Ciba-Geigy Corp.), 1 part by mass of a sensitizer (Kayacure DETX, manufactured by NIPPON KAYAKU CO., LTD.) in 204.0 parts by mass of methyl ethyl ketone. The coating liquid was applied on the alignment film with a #3.4 wire bar, which was set to a metal frame and heated in a constant-temperature bath at 120° C. for 150 seconds, then, using a high pressure mercury lamp of 120 W/cm, ultraviolet rays were irradiated at 110° C. for 1 minute to polymerize the discotic liquid crystalline compound (DX). Then, it was cooled down to room temperature. In this way, an optically anisotropic layer (1-3) was formed and an optical compensatory sheet was manufactured.

(Measurement of Optical Properties)

The alignment film was manufactured on a glass in a way similar to that in Example 1, and the optically anisotropic layer (1-3) was formed in a way as described above. A retardation value Re(550) of the optically anisotropic layer (1-3) was measured using KOBRA 21ADH (manufactured by Oji Scientific Instruments) with light of a wavelength 550 nm to give 30.5 nm. Further, retardations were measured using KOBRA 21ADH (manufactured by Oji Scientific Instruments) with light of a wavelength of 450 nm or 650 nm to give Re(450)/Re(650) of 1.27. The thickness of the optically anisotropic layer (1-3) was measured to give 1.6 μm.

(Manufacture of Elliptically Polarizing Plate)

The elliptically polarizing plate was manufactured in a way similar to that in Example 1.

(Manufacture of Bend Alignment Mode Liquid Crystal Display Device)

A bend alignment liquid crystal cell and a liquid crystal display device were manufactured in a way similar to that in Example 1 to be a liquid crystal display device in Comparative Example 3. The evaluation results are shown in Table 1.

TABLE 1

|  | Ex. 1 | Comp. Ex. 1 | Comp. Ex. 2 | Comp. Ex. 3 |
|---|---|---|---|---|
| Re(450)/Re(650) | 1.15 | 1.27 | 1.27 | 1.27 |
| Re_m(550)/d | 0.118 | 0.084 | 0.084 | 0.084 |
| d (μm) | 0.8 | 0.8 | 1.6 | 1.6 |
| Alignment time | 90 sec. | 90 sec. | No alignment at 90 sec. | 150 sec. |
| Front contrast | 450 | 320 | — | 300 |
| V' | 0.44 | 0.37 | — | 0.37 |
| Contrast view angle top and bottom | 160 | 100 | — | 155 |
| Contrast view angle right and left | 160 | 110 | — | 160 |
| Reversal view angle top and bottom | 160 | 100 | — | 155 |
| Reversal view angle right and left | 140 | 90 | — | 140 |

CONCLUSION

As is clear from Table 1, the liquid crystal display device of the invention has a high front contrast, wide contrast view angles and reversal view angles at all of top, bottom, right and left, and shows a little bluish hue at the time of black level. Further, it is recognized that the period necessary for alignment of the liquid crystalline compound is short and productivity is high.

On the other hand, display devices in Comparative Examples 1 and 3 that do not satisfy Re(450)/Re(650)<1.25 have a low front contrast and show strong bluish hue at the time of black level. The display device in Comparative Example 1 that does not satisfy 0.11<Re_m(550)/d and is thin requires a short time for alignment, but can not give sufficient optical properties and has bad view property. Further, it is recognized that the display device in Comparative Example 3 that does not satisfy 0.11<Re_m(550)/d and is thick requires a long time for alignment to cause degradation of productivity and more use amount of the liquid crystal compound.

The present disclosure relates to the subject matter contained in Japanese Patent Application No. 269564/2005 filed on Sep. 16, 2005, which is expressly incorporated herein by reference in its entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by claims set forth below.

What is claimed is:

1. An optical film comprising an optically anisotropic layer (1) including a liquid crystalline compound, wherein the optically anisotropic layer (1) satisfies the following formulae (1) and (2):

$$Re(450)/Re(650)<1.25 \qquad \text{Formula (1):}$$

wherein Re(450) and Re(650) are in-plane retardation values (unit: nm) of the optically anisotropic layer (1) at wavelengths of 450 nm and 650 nm, respectively;

$$0.09<Re\_m(550)/d \qquad \text{Formula (2):}$$

wherein Re_m(550) is an in-plane retardation value (unit: nm) of a uniaxial alignment layer in which the director of a liquid crystalline compound constituting the optically anisotropic layer (1) is aligned to be parallel in the plane at a wavelength of 550 nm, and d is the thickness of the uniaxial alignment layer (unit: nm).

2. The optical film according to claim 1, wherein the thickness of the optically anisotropic layer (1) is 1.5 μm or less.

3. The optical film according to claim 1, wherein the liquid crystalline compound constituting the optically anisotropic layer (1) is a discotic liquid crystalline compound.

4. The optical film according to claim 1, wherein the discotic liquid crystalline compound is a polymer of a compound represented by the following formula (DI):

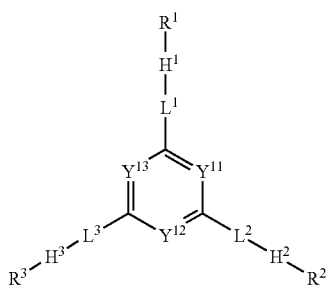

Formula (DI)

wherein $Y^{11}$, $Y^{12}$ and $Y^{13}$ each independently represents methine or a nitrogen atom, $L^1$, $L^2$ and $L^3$ each independently represents a single bond or a divalent linking group, and $H^1$, $H^2$ and $H^3$ each independently represents the following formula (DI-A) or the following formula (DI-B):

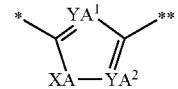

Formula (DI-A)

wherein $YA^1$ and $YA^2$ each independently represents methine or a nitrogen atom, XA represents an oxygen atom, a sulfur atom, methylene or imino, * represents a position to be bonded to $L^1$-$L^3$ sides in the formula (DI), and ** represents a position to be bonded to $R^1$-$R^3$ sides in the formula (DI);

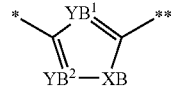

Formula (DI-B)

wherein $YB^1$ and $YB^2$ each independently represents methine or a nitrogen atom, XB represents an oxygen atom, a sulfur atom, methylene or imino, * represents the position to be bonded to $L^1$-$L^3$ sides in the formula (DI), and ** represents the position to be bonded to $R^1$-$R^3$ sides in the formula (DI), $R^1$, $R^2$ and $R^3$ each independently represents the following formula (DI-R):

$$*\text{-}(\text{-}L^{21}\text{-}Q^2)_{n1}\text{-}L^{22}\text{-}L^{23}\text{-}Q^1 \qquad \text{Formula (DI-R):}$$

wherein * represents the position to be bonded to $H^1$-$H^3$ sides in the formula (DI), $L^{21}$ is a single bond or a divalent linking group, $L^{22}$ represents —O—, —O—CO—, —CO—O—, —O—CO—O—, **—S—, *—N(R)—, —CH$_2$—, —CH=CH— or —C≡C—,  represents the position to be bonded to the $Q^2$ side, $L^{23}$ represents a divalent linking group selected from the group consisting of —O—, —S—, —C(=O)—, —NH—, —CH$_2$—, —CH=CH—, —C≡C— and combinations of these, $Q^1$ represents a polymerizable group or a hydrogen atom, and $Q^2$ represents a divalent group having at least one type of a cyclic structure.

5. The optical film according to claim 1 further comprising an optically anisotropic layer (2), wherein the optically anisotropic layer (2) is a cellulose acylate film.

6. A polarizing plate comprising the optical film according to claim 1 and a polarizing film.

7. The polarizing plate according to claim 6, wherein the optical film comprises a cellulose acylate film.

8. A liquid crystal display device comprising a liquid crystal cell and the polarizing plate according to claim 6.

9. The liquid crystal display device according to claim 8, wherein the polarizing plate comprises a cellulose acylate film.

10. The liquid crystal display device according to claim 8, wherein the liquid crystal cell is of an OCB system.

* * * * *